United States Patent
Chu et al.

(10) Patent No.: US 12,503,591 B2
(45) Date of Patent: *Dec. 23, 2025

(54) LIQUID CRYSTAL POLYMER, COMPOSITION, LIQUID CRYSTAL POLYMER FILM, LAMINATED MATERIAL AND METHOD OF FORMING LIQUID CRYSTAL POLYMER FILM

(71) Applicant: INDUSTRIAL TECHNOLOGY RESEARCH INSTITUTE, Hsinchu (TW)

(72) Inventors: Yu-Lin Chu, New Taipei (TW); Jen-Chun Chiu, Zhubei (TW); Po-Hsien Ho, Taipei (TW); Yu-Min Han, Taichung (TW); Meng-Hsin Chen, Pingtung County (TW); Chih-Hsiang Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,559

(22) Filed: Sep. 22, 2023

(65) Prior Publication Data

US 2024/0124706 A1   Apr. 18, 2024

Related U.S. Application Data

(60) Provisional application No. 63/408,937, filed on Sep. 22, 2022.

(51) Int. Cl.
*G02F 1/1333* (2006.01)
*C08G 63/60* (2006.01)
(Continued)

(52) U.S. Cl.
CPC ............ *C08L 67/06* (2013.01); *C08G 63/605* (2013.01); *C08G 69/44* (2013.01); *C08J 5/124* (2013.01);
(Continued)

(58) Field of Classification Search
CPC ............... C09K 19/38; C09K 19/3804; C09K 2019/0444; C09K 2019/0448; G02F 1/1333
See application file for complete search history.

(56) References Cited

U.S. PATENT DOCUMENTS 5,191,057 A    3/1993   Niki et al.
7,022,807 B2   4/2006   Okamoto et al.
(Continued)

FOREIGN PATENT DOCUMENTS

CN   101104705 B   10/2010
CN   109749066 A   5/2019
(Continued)

OTHER PUBLICATIONS

Japanese Office Action for Japanese Application No. 2023-158318, dated Sep. 25, 2024, with English translation.
(Continued)

*Primary Examiner* — Geraldina Visconti
(74) *Attorney, Agent, or Firm* — Birch, Stewart, Kolasch & Birch, LLP

(57) ABSTRACT

A liquid crystal polymer, composition, liquid crystal polymer film, laminated material and method of forming liquid crystal polymer film are provided. The liquid crystal polymer includes a first repeating unit, a second repeating unit, a third repeating unit, and a fourth repeating unit. The first repeating unit has a structure of Formula (I), the second repeating unit has a structure of Formula (II), the third repeating unit has a structure of Formula (III), and the fourth repeating unit has a structure of Formula (IV), a structure of Formula (V) or a structure of Formula (VI)

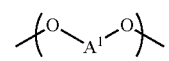

Formula (I)

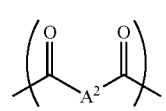

Formula (II)

Formula (III)

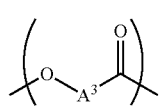

Formula (IV)

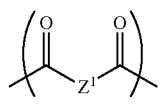

Formula (V)

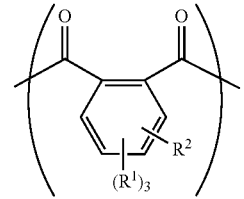

Formula (VI)

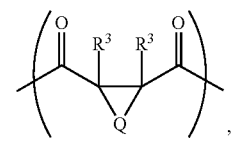

wherein $A^1$, $A^2$, $A^3$, $Z^1$, $R^1$, $R^2$, $R^3$ and Q are as defined in the specification.

19 Claims, 1 Drawing Sheet

(51) Int. Cl.

| | | |
|---|---|---|
| *C08G 69/44* | (2006.01) | |
| *C08J 5/12* | (2006.01) | |
| *C08J 5/18* | (2006.01) | |
| *C08L 67/06* | (2006.01) | |
| *C08L 77/12* | (2006.01) | |
| *C09K 19/38* | (2006.01) | |

(52) U.S. Cl.
CPC ................. *C08J 5/18* (2013.01); *C08L 77/12* (2013.01); *C09K 19/38* (2013.01); *C08G 2250/00* (2013.01); *C08J 2367/06* (2013.01); *C08J 2377/12* (2013.01); *C08L 2203/16* (2013.01); *C08L 2205/025* (2013.01); *C08L 2205/12* (2013.01); *C09K 2219/03* (2013.01)

(56) References Cited

U.S. PATENT DOCUMENTS

| | | |
|---|---|---|
| 11,572,438 B2 | 2/2023 | Chu et al. |
| 2004/0210032 A1 | 10/2004 | Okamoto et al. |
| 2010/0139961 A1 | 6/2010 | Kim et al. |
| 2019/0078022 A1 | 3/2019 | Lee |
| 2021/0002507 A1 | 1/2021 | Azami et al. |
| 2022/0250371 A1 | 8/2022 | Ogawa et al. |
| 2024/0124706 A1* | 4/2024 | Chu ................. C09K 19/38 |
| 2024/0150656 A1* | 5/2024 | Chu ................. C08G 63/685 |

FOREIGN PATENT DOCUMENTS

| | | |
|---|---|---|
| CN | 112980004 A | 6/2021 |
| JP | 57-145123 A | 9/1982 |
| JP | 63-182340 A | 7/1988 |
| JP | 2-117916 A | 5/1990 |
| JP | 7-233249 A | 9/1995 |
| JP | 10-206637 A | 8/1998 |
| JP | 2000-508002 A | 6/2000 |
| JP | 2001-261946 A | 9/2001 |
| JP | 4470390 B2 | 6/2010 |
| JP | 2011-208140 A | 10/2011 |
| JP | 2014-80557 A | 5/2014 |
| JP | 2021-8617 A | 1/2021 |
| JP | 2024-52580 A | 4/2024 |
| TW | I356834 B1 | 1/2012 |
| TW | I618097 B | 3/2018 |
| TW | I650358 B | 2/2019 |
| TW | 202128822 A | 8/2021 |

OTHER PUBLICATIONS

Non-Final Office Action issued Nov. 22, 2024, in U.S. Appl. No. 18/371,650.

Ji et al., "Progress of liquid crystal polyester (LCP) for 5G application," Advanced Industrial and Engineering Polymer Research 3, Oct. 23, 2020, pp. 160-174.

Taiwanese Office Action and Search Report for Taiwanese Application No. 112136203, dated May 7, 2024.

Japanese Notice of Allowance for Japanese Application No. 2023-158315, dated Oct. 16, 2024.

* cited by examiner

LIQUID CRYSTAL POLYMER, COMPOSITION, LIQUID CRYSTAL POLYMER FILM, LAMINATED MATERIAL AND METHOD OF FORMING LIQUID CRYSTAL POLYMER FILM

CROSS REFERENCE TO RELATED APPLICATIONS

This application claims the benefit of U.S. Provisional Application No. 63/408,937, filed on Sep. 22, 2022, which is hereby incorporated by reference herein in its entirety.

TECHNICAL FIELD

The disclosure relates to a liquid crystal polymer, composition, liquid crystal polymer film, laminated material and method of forming liquid crystal polymer film.

BACKGROUND

In recent years, liquid crystal polymer (LCP) has been widely utilized in many high-value, high-end applications, especially in LCP films. Among these applications, the progress in liquid crystal polymer film development has been particularly noteworthy. Due to the characteristics of low moisture absorption, low-k dielectric coefficient, and low dielectric loss factor in liquid crystal polymers, the current application of polyimide (PI) films on flexible copper foil laminated substrates (FCCL) for handheld mobile communication may become insufficient with the advent of the 4G/5G high-speed transmission era, and there is potential for liquid crystal polymer films to take their place.

However, existing liquid crystal polymer films commonly exhibit a coefficient of thermal expansion (CTE) that is excessively high. This high CTE poses a challenge when applying liquid crystal polymer films to copper foil laminated substrates, as it prevents effective matching with copper foil. This limitation significantly restricts the applicability of liquid crystal polymer films.

Accordingly, a novel liquid crystal polymer with low coefficient of thermal expansion is called for to solve the aforementioned problems.

SUMMARY

The disclosure provides a liquid crystal polymer. According to embodiments of the disclosure, the liquid crystal polymer includes a first repeating unit, a second repeating unit, a third repeating unit, and a fourth repeating unit. The first repeating unit has a structure of Formula (I), the second repeating unit has a structure of Formula (II), the third repeating unit has a structure of Formula (III), and the fourth repeating unit has a structure of Formula (IV), a structure of Formula (V), or a structure of Formula (VI)

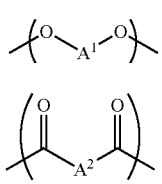

Formula (I)

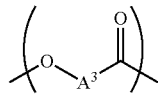

Formula (II)

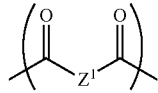

Formula (III)

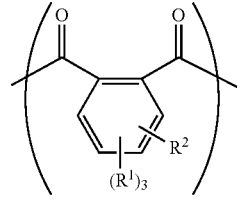

Formula (IV)

Formula (V)

Formula (VI)

wherein $A^1$, $A^2$, and $A^3$ are independently $A^4$, or $A^4$-$X^1$-$A^5$, $A^4$ and $A^5$ are independently

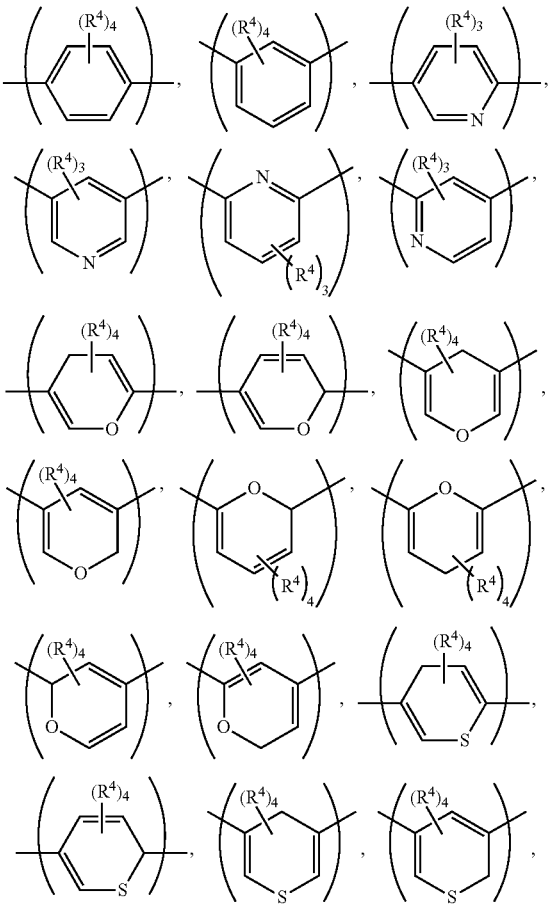

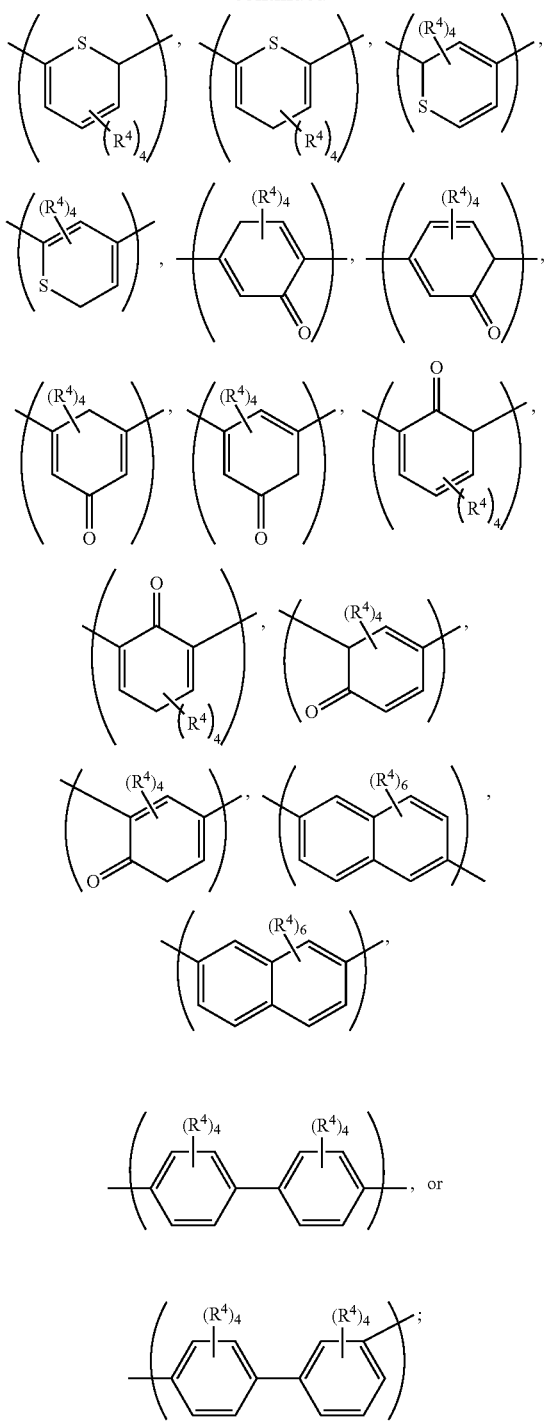

$X^1$ is a single bond, —O—, —NH—,

C1-C8 alkylene group, C5-C8 cycloalkylene group, or

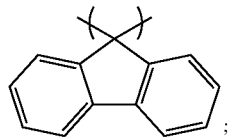

$Z^1$ is non-substituted C2-C20 alkenylene group, or substituted C2-C20 alkenylene group; $R^1$ are independently hydrogen, fluorine, chlorine, C1-C6 alkyl group, C1-C6 fluoroalkyl group, or C6-C12 aryl group; $R^2$ is $-(X^2-Z^2-R^5)$; $R^3$ are independently hydrogen, fluorine, chlorine, C1-C6 alkyl group, or C1-C6 fluoroalkyl group; $R^4$ are independently hydrogen, fluorine, chlorine, cyano group, C1-C6 alkyl group, C1-C6 fluoroalkyl group, C1-C6 alkoxy group, C1-C6 alkylthio group, C1-C6 cyanoalkyl group, C6-C12 aryl group, C7-C18 arylalkyl group, C6-C12 aryloxy group, or C6-C12 arylthio group; $X^2$ is a single bond, —O—, —NH—,

$Z^2$ is a single bond or C1-C8 alkylene group; $R^5$ is C2-C20 alkenyl group, acrylate group, methacrylate group,

and Q is optionally combined with the carbon atoms which they are attached to, to form a C4-C8 cycloalkene, non-substituted norbornene, non-substituted 7-oxanorbornene, substituted norbornene, or substituted 7-oxanorbornene.

The disclosure provides a composition is used to form a liquid crystal polymer film. According to embodiments of the disclosure, the composition includes a first liquid crystal polymer. The first liquid crystal polymer is the liquid crystal polymer of the disclosure.

The disclosure provides a liquid crystal polymer film and a laminated material. According to embodiments of the disclosure, the laminated material includes a support, and the liquid crystal polymer film of the disclosure.

The disclosure provides a method for forming a liquid crystal polymer film of the disclosure. The method for forming the liquid crystal polymer film includes following steps. The composition of the disclosure is subjected to a melting process or a solution process, obtaining the liquid crystal polymer film.

A detailed description is given in the following embodiments.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
FIG. 1 is a cross-sectional view of the laminated material according to embodiments of the disclosure.

The liquid crystal polymer, composition, liquid crystal polymer film, laminated material and method of forming liquid crystal polymer film are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. As used herein, the term "about" in quantitative terms refers to plus or minus an amount that is general and reasonable to persons skilled in the art.

Moreover, the use of ordinal terms such as "first", "second", "third", etc., in the disclosure to modify an element does not by itself connote any priority, precedence, or der of one claim element over another or the temporal order in which it is formed, but are used merely as labels to distinguish one claim element having a certain name from another element having the same name (but for use of the ordinal term) to distinguish the claim elements.

It should be noted that the elements or devices in the drawings of the disclosure may be present in any form or configuration known to those skilled in the art. In addition, the expression "a layer overlying another layer", "a layer is disposed above another layer", "a layer is disposed on another layer", and "a layer is disposed over another layer" may refer to a layer that directly contacts the other layer, and they may also refer to a layer that does not directly contact the other layer, there being one or more intermediate layers disposed between the layer and the other layer.

The drawings described are only schematic and are non-limiting. In the drawings, the size, shape, or thickness of some of the elements may be exaggerated and not drawn on scale for illustrative purposes. The dimensions and the relative dimensions do not correspond to actual location to practice of the disclosure. The disclosure will be described with respect to particular embodiments and with reference to certain drawings but the disclosure is not limited thereto.

The disclosure provides a liquid crystal polymer. Since the conventional liquid crystal polymer exhibits higher coefficient of thermal expansion, the applicability of the liquid crystal polymer is significantly restricted. In order to reduce the coefficient of thermal expansion of the liquid crystal polymer and make it closer to the selected substrate for forming a laminated material, anhydride (or diacid) monomers containing reactive carbon-carbon double bonds (such as non-aromatic carbon-carbon double bonds) are introduced into the composition used to prepare the liquid crystal polymer. The incorporation results in the liquid crystal polymer of the disclosure having repeating units capable of undergoing a cross-linking reaction. Consequently, through polymerization involving reactive carbon-carbon double bonds, the composition including the liquid crystal polymer of the disclosure can form a liquid crystal polymer film with a cross-linked network structure after thermal treatment, thereby improving the dimensional stability of the liquid crystal polymer film. As a result, on the premise that the dielectric coefficient (Dk) and dielectric loss factor (Df) are not increased, the coefficient of thermal expansion of the liquid crystal polymer film is reduced, achieving a better match of the coefficient of thermal expansion between the liquid crystal polymer film and the substrate (such as copper foil substrate) used in the laminated material. Therefore, the liquid crystal polymer film is prevented from peeling from the laminated material.

In addition, the liquid crystal polymer of the disclosure may be used in concert with a liquid crystal polymer which exhibit solubility (i.e. being easy to dissolve in the solvent), and the liquid crystal polymer of the disclosure can be uniformly dispersed in the solvent. As a result, the obtained composition may be subjected to a solution process to prepare a liquid crystal polymer film with improved processability.

According to embodiments of the disclosure, the liquid crystal polymer can include a first repeating unit, a second repeating unit, a third repeating unit, and a fourth repeating unit. According to embodiments of the disclosure, the first repeating unit has a structure of Formula (I), the second repeating unit has a structure of Formula (II), the third repeating unit has a structure of Formula (III), and the fourth repeating unit has a structure of Formula (IV), a structure of Formula (V), or a structure of Formula (VI)

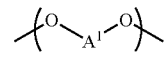

Formula (I)

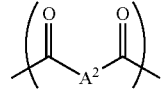

Formula (II)

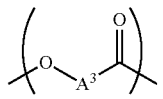

Formula (III)

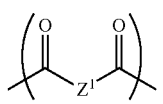

Formula (IV)

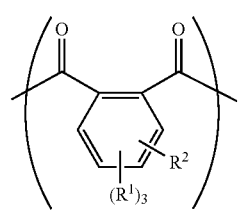

Formula (V)

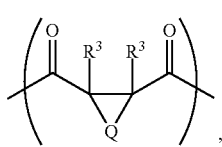

Formula (VI)

wherein $A^1$, $A^2$, and $A^3$ are independently $A^4$, or $A^4$-$X^1$-$A^5$, $A^4$ and $A^5$ are independently

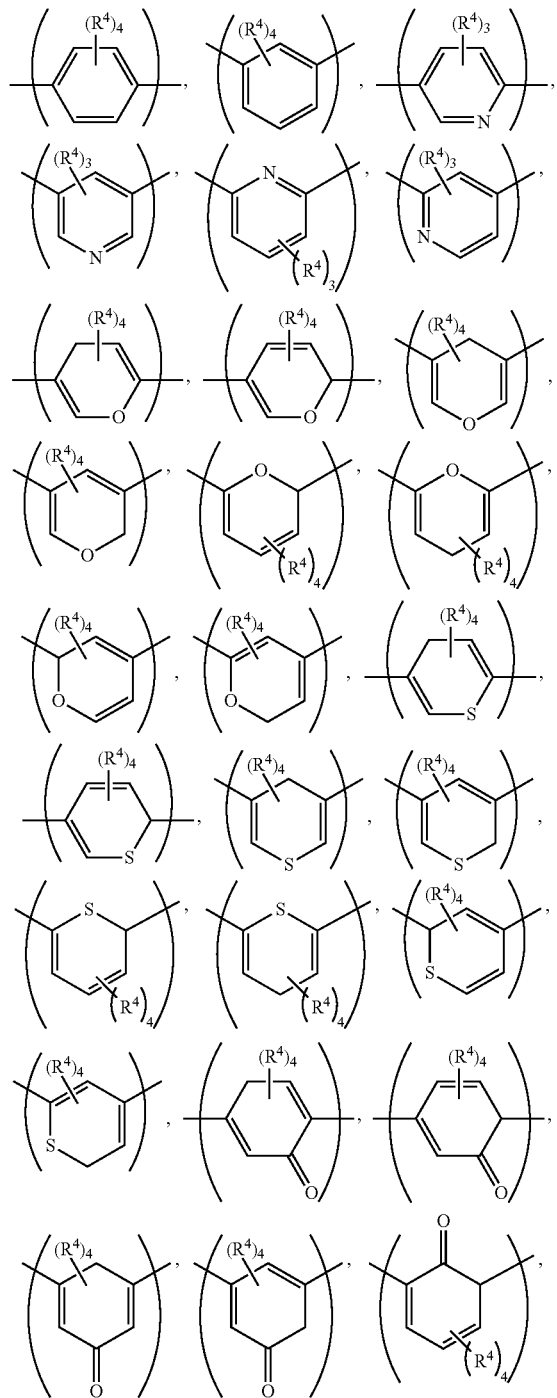

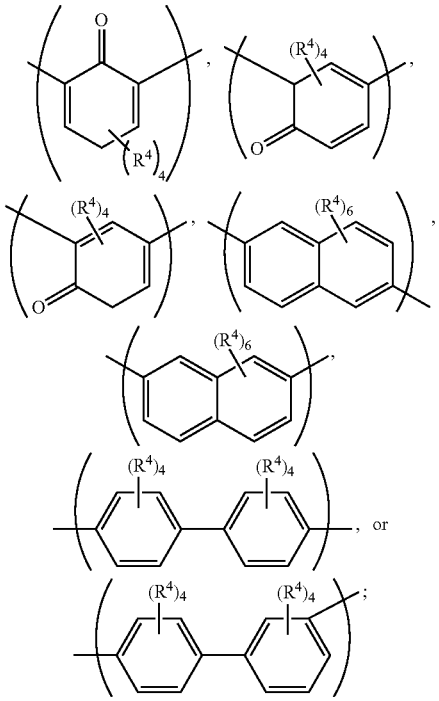

$X^1$ is a single bond, —O—, —NH—,

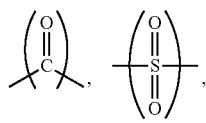

C1-C8 alkylene group, C5-C8 cycloalkylene group, or

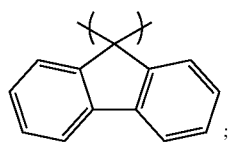

$Z^1$ is C2-C20 alkenylene group or substituted C2-C20 alkenylene group; $R^1$ are independently hydrogen, fluorine, chlorine, C1-C6 alkyl group, C1-C6 fluoroalkyl group, or C6-C12 aryl group; $R^2$ is —(X²—Z²—R⁵); $R^3$ are independently hydrogen, fluorine, chlorine, C1-C6 alkyl group, or C1-C6 fluoroalkyl group; $R^4$ are independently hydrogen, fluorine, chlorine, cyano group, C1-C6 alkyl group, C1-C6 fluoroalkyl group, C1-C6 alkoxy group, C1-C6 alkylthio group, C1-C6 cyanoalkyl group, C6-C12 aryl group, C7-C18 arylalkyl group, C6-C12 aryloxy group, or C6-C12 arylthio group; $X^2$ is a single bond, —O—, —NH—,

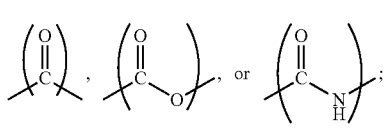

$Z^2$ is a single bond or C1-C8 alkylene group; $R^5$ is C2-C20 alkenyl group, acrylate group, methacrylate group,

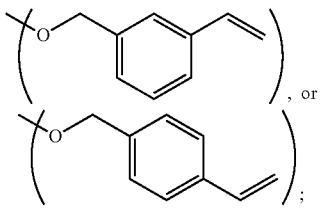, or and Q is optionally combined with the carbon atoms which they are attached to, to form a C4-C8 cycloalkene, non-substituted norbornene, non-substituted 7-oxanorbornene, substituted norbornene, or substituted 7-oxanorbornene. According to embodiments of the disclosure, when $Z^2$ is a single bond, $R^5$ is C2-C20 alkenyl group.

According to embodiments of the disclosure, the substituted norbornene means at least one of the hydrogen bonded with the carbon of norbornene may be optionally replaced with fluorine, chlorine, C1-C6 alkyl group, or C1-C6 fluoroalkyl group.

According to embodiments of the disclosure, the substituted 7-oxanorbornene means at least one of the hydrogen bonded with the carbon of 7-oxanorbornene may be optionally replaced with fluorine, chlorine, C1-C6 alkyl group, or C1-C6 fluoroalkyl group.

According to embodiments of the disclosure, the liquid crystal polymer can include at least one of the first repeating unit, at least one of the second repeating unit, at least one of the third repeating unit, and at least one of fourth repeating unit. Namely, the liquid crystal polymer can include at least one of repeating unit having a structure represented by Formula (I), at least one of repeating unit having a structure represented by Formula (II), at least one of repeating unit having a structure represented by Formula (III), and at least one of repeating unit having a structure represented by Formula (IV), represented by Formula (V) or represented by Formula (VI).

According to embodiments of the disclosure, the first repeating unit may be

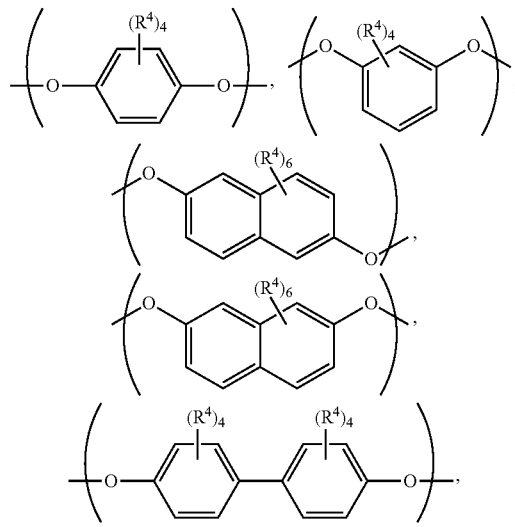

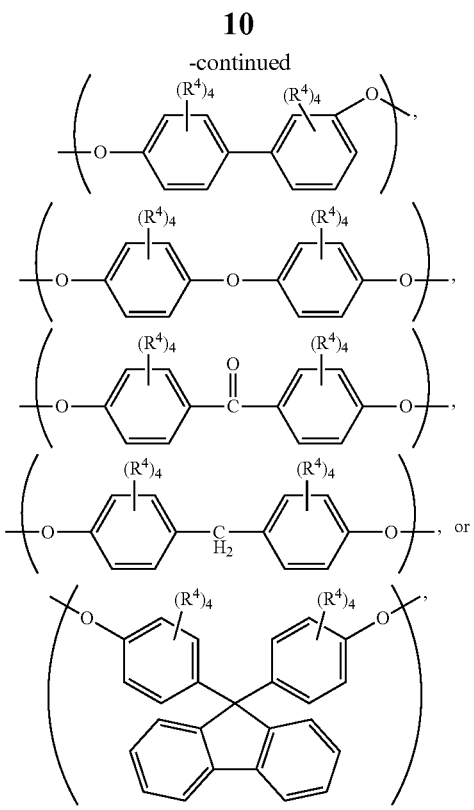

wherein $R^4$ is the same as defined above.

According to embodiments of the disclosure, the second repeating unit may be

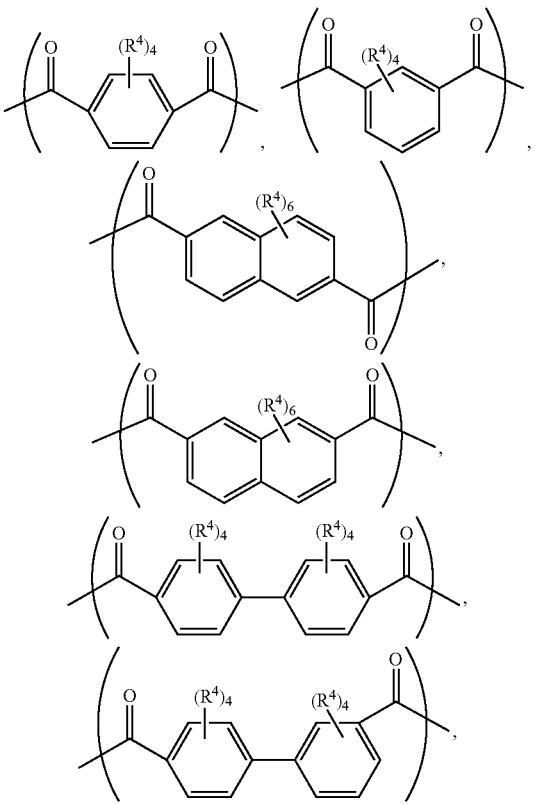

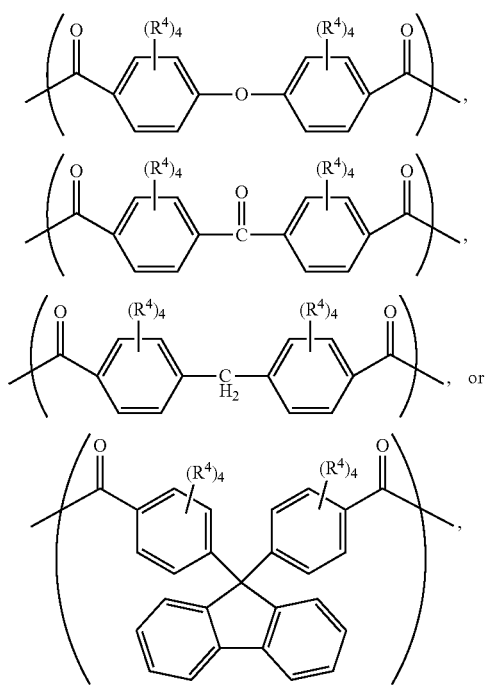
wherein R⁴ is the same as defined above.
According to embodiments of the disclosure, the third repeating unit may be
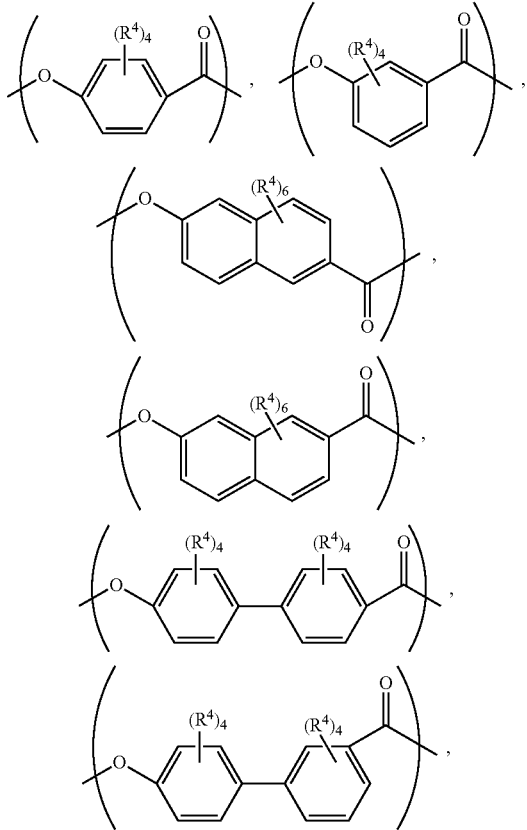
wherein R⁴ is the same as defined above.
According to embodiments of the disclosure, the fourth repeating unit may be
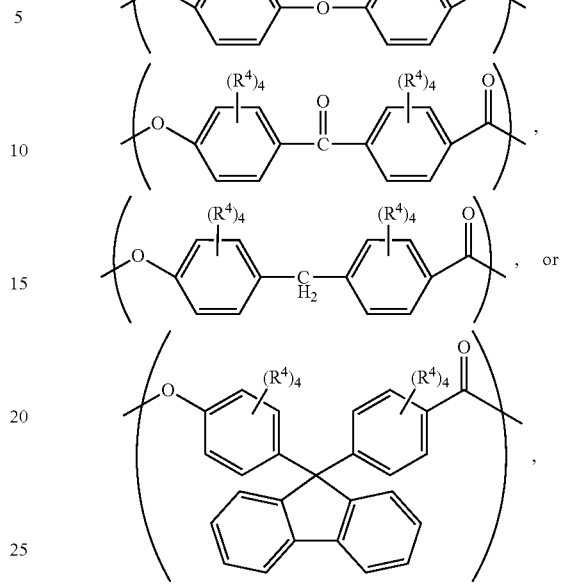
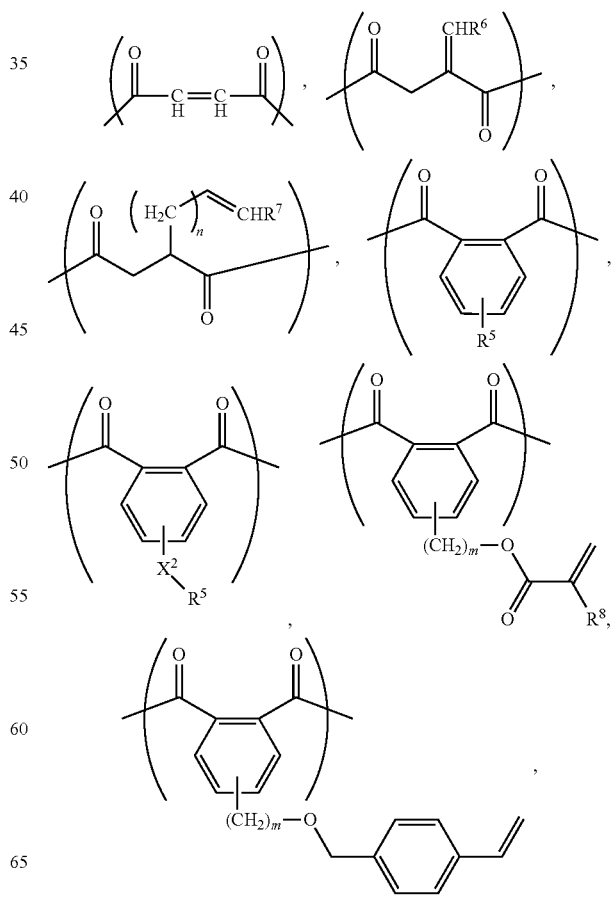

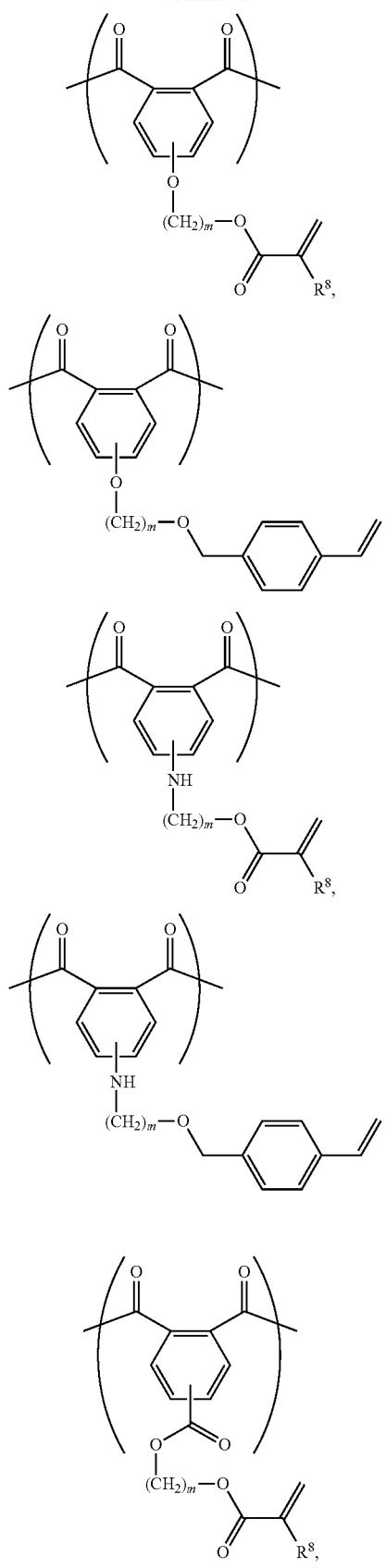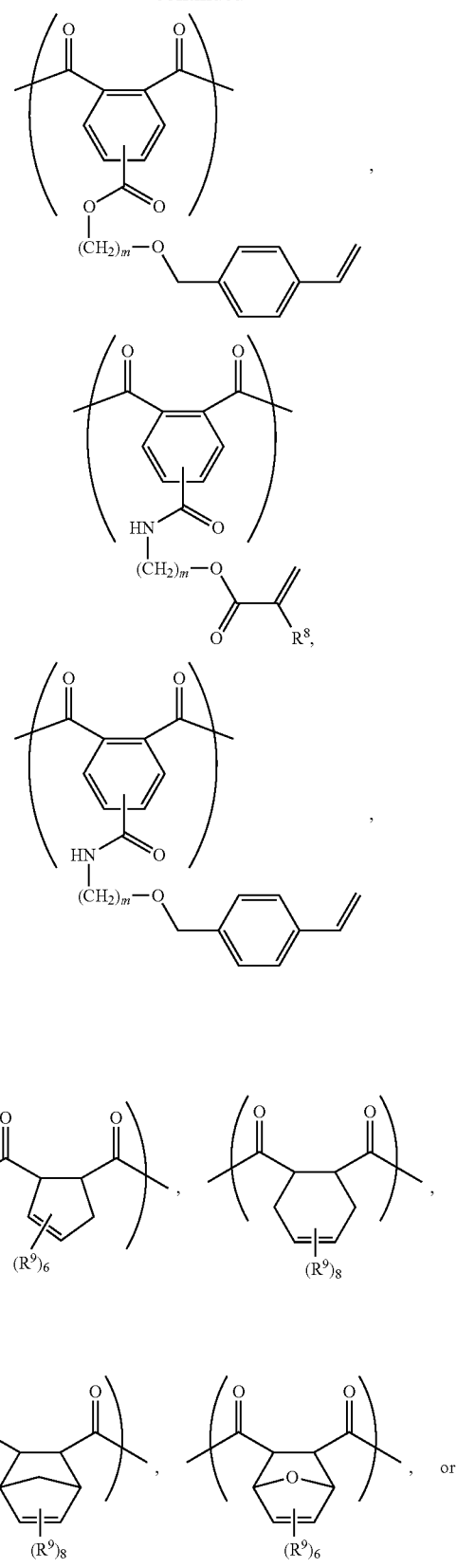

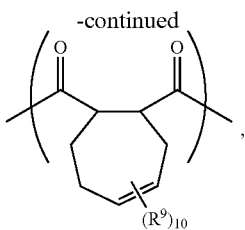

wherein $X^2$ is —O—, —NH—,

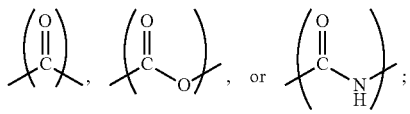

$R^5$ is C2-C20 alkenyl group; $R^6$ is hydrogen or C1-C17 alkyl group; $R^7$ is hydrogen or C1-C15 alkyl group; $R^8$ is hydrogen or methyl; $R^9$ are independently hydrogen, fluorine, chlorine, C1-C6 alkyl group, or C1-C6 fluoroalkyl group; n is an integer from 1 to 16 (such as 1, 2, 3, 4, 5, 6, 7, 8, 9, 10, 11, 12, 13, 14, 15, or 16); and m is an integer from 1 to 8 (such as 1, 2, 3, 4, 5, 6, 7, or 8).

According to embodiments of the disclosure, the alkyl group of the disclosure may be linear or branched alkyl group. According to embodiments of the disclosure, the alkenyl group of the disclosure may be linear or branched alkenyl group and includes at least one carbon-carbon double bond.

For example, C1-C6 alkyl group may be methyl, ethyl, propyl, butyl, pentyl, hexyl, heptyl, octyl, or an isomer thereof. According to embodiments of the disclosure, C2-C20 alkenyl may be ethenyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, or an isomer thereof.

According to embodiments of the disclosure, the fluoroalkyl group of the disclosure may be an alkyl group which a part of or all hydrogen atoms bonded on the carbon atom are replaced with fluorine atoms, and may be linear or branched.

For example, C1-C8 fluoroalkyl group may be fluoromethyl, fluoroethyl, fluoropropyl, fluorobutyl, fluoropentyl, fluorohexyl, fluoroheptyl, fluorooctyl, or an isomer thereof. For example, fluoromethyl group may be monofluoromethyl group, difluoromethyl group or trifluoromethyl group, and fluoroethyl group may be monofluoroethyl group, difluoroethyl group, trifluoroethyl group, tetrafluoroethyl, or perfluoroethyl.

According to embodiments of the disclosure, the alkoxy group of the disclosure may be linear or branched alkoxy group. According to embodiments of the disclosure, the alkylthio group of the disclosure may be linear or branched alkylthio group. According to embodiments of the disclosure, the cyanoalkyl group of the disclosure may be linear or branched cyanoalkyl group.

For example, C1-C6 alkoxy group may be methoxy, ethoxy, propoxy, butoxy, pentoxy, hexoxy, or an isomer thereof. For example, C1-C6 alkylthio group may be methylthio, ethylthio, propylthio, butylthio, pentylthio, hexylthio, or an isomer thereof. For example, C1-C6 cyanoalkyl group may be cyanomethyl, cyanoethyl, cyanopropyl, cyanobutyl, cyanopentyl, cyanohexyl, or an isomer thereof.

According to embodiments of the disclosure, the C6-C12 aryl group of the disclosure may be phenyl group, biphenyl group, or naphthyl group.

According to embodiments of the disclosure, the C7-C18 arylalkyl group means the hydrogen of C1-C6 alkyl group is substituted with C6-C12 aryl group. For example, C7-C18 arylalkyl group may be benzyl, phenyl ethyl, phenylpropyl, phenylbutyl, phenylpentyl, phenylhexyl, or an isomer thereof.

According to embodiments of the disclosure, the aryloxy group means the hydrogen of hydroxyl group is substituted with aryl group. For example, C6-C12 aryloxy group may be phenoxy group, or naphthyloxy.

According to embodiments of the disclosure, the arylthio group means the hydrogen of thiol group is substituted with aryl group. For example, C6-C12 arylthio group may be phenylthio group or naphthylthio.

The alkylene group of the disclosure may be linear or branched alkylene group. According to embodiments of the disclosure, the alkenylene group of the disclosure may be linear or branched alkenylene group.

For example, C1-C8 alkylene group may be methylene group, ethylene group, propylene group, butylene group, pentylene group, hexylene group, heptylene group, octylene group, or an isomer thereof. For example, C2-C20 alkenylene group may be ethenylene, propenylene, butenylene, pentenylene, hexenylene, heptenylene, octenylene, nonenylene, decenylene, undecenylene, dodecenylene, hexadecenylene, octadecenylene, or an isomer thereof. For example, C5-C8 cycloalkylene group may be cyclopentylene group, cyclohexylene group, cycloheptylene group, cyclooctylene group, or an isomer thereof.

According to embodiments of the disclosure, the substituted C2-C20 alkenylene group means at least one of the hydrogen bonded with the carbon of C2-C20 alkenylene group may be optionally replaced with fluorine, chlorine, or phenyl group.

According to embodiments of the disclosure, the liquid crystal polymer may consist of the first repeating unit, the second repeating unit, the third repeating unit, and the fourth repeating unit. According to embodiments of the disclosure, the liquid crystal polymer does not include other repeating unit except the first repeating unit, the second repeating unit, the third repeating unit, and the fourth repeating unit.

According to embodiments of the disclosure, in the liquid crystal polymer of the disclosure, the content of the first repeating unit may be $M_1$ mol %, wherein $M_1$ is 5 to 70, such as 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69; the content of the second repeating unit is $M_2$ mol %, wherein $M_2$ is 5 to 70, such as 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69; the content of the third repeating unit is $M_3$ mol %, wherein $M_3$ is 10 to 90, such as 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, or 89, based on the total molar amount of the first repeating unit, the second repeating unit, and the third repeating unit (i.e. the sum of $M_1$, $M_2$, $M_3$ is 100). In addition, According to embodiments of the disclosure, the amount of the fourth repeating unit is $M_4$ mol %, wherein $M_4$ is 0.01 to 10, such as 0.02, 0.03, 0.05, 0.08, 0.1, 0.2, 0.3, 0.5, 0.8, 1, 1.5, 2, 3, 4, 5, 6, 7, 8, or 9, based on the total molar amount of the first repeating unit, the second repeating unit, and the third repeating unit.

According to embodiments of the disclosure, when the amount of the first repeating unit is too low, the liquid crystal polymer exhibits poorer crystallinity; and when the amount of the first repeating unit is too high, the liquid crystal polymer exhibits poorer flexibility.

According to embodiments of the disclosure, when the amount of the second repeating unit is too low, the liquid crystal polymer exhibits poorer flexibility; and when the amount of the second repeating unit is too high, the liquid crystal polymer exhibits poorer crystallinity.

According to embodiments of the disclosure, when the amount of the third repeating unit is too low, the liquid crystal polymer exhibits poorer crystallinity; and when the amount of the third repeating unit is too high, the liquid crystal polymer exhibits poorer flexibility.

According to embodiments of the disclosure, when the amount of the fourth repeating unit is too low, the liquid crystal polymer film prepared from the liquid crystal polymer exhibits lower cross-linking degree, thereby limiting the effectiveness for reducing coefficient of thermal expansion of the obtained liquid crystal polymer film. When the amount of the fourth repeating unit is too high, the liquid crystal polymer film prepared from the liquid crystal polymer exhibits higher cross-linking degree, thereby deteriorating the properties (such as hygroscopicity, mechanical property and dielectric characteristic) of the obtained liquid crystal polymer film.

According to embodiments of the disclosure, based on the total molar amount of the first repeating unit, the second repeating unit, and the third repeating unit, the content of the first repeating unit is 5 mol % to 70 mol % (such as 10 mol %, 15 mol %, 20 mol %, 25 mol %, 30 mol %, 35 mol %, 40 mol %, 45 mol %, 50 mol %, 55 mol %, 60 mol %, or 65 mol %); the content of the second repeating unit is 5 mol % to 70 mol % (such as 10 mol %, 15 mol %, 20 mol %, 25 mol %, 30 mol %, 35 mol %, 40 mol %, 45 mol %, 50 mol %, 55 mol %, 60 mol %, or 65 mol %); and the content of the third repeating unit is 10 mol % to 90 mol % (such as 15 mol %, 20 mol %, 25 mol %, 30 mol %, 35 mol %, 40 mol %, 45 mol %, 50 mol %, 55 mol %, 60 mol %, 65 mol %, 70 mol %, 75 mol %, 80 mol %, or 85 mol %). In addition, the amount of the fourth repeating unit is 0.01 mol % to 10 mol % (such as 0.02 mol %, 0.03 mol %, 0.05 mol %, 0.08 mol %, 0.1 mol %, 0.2 mol %, 0.3 mol %, 0.5 mol %, 0.8 mol %, 1 mol %, 1.5 mol %, 2 mol %, 3 mol %, 4 mol %, 5 mol %, 6 mol %, 7 mol %, 8 mol %, or 9 mol %), based on the total molar amount of the first repeating unit, the second repeating unit, and the third repeating unit.

According to another embodiment of the disclosure, the content of the first repeating unit is 5 mol % to 70 mol %, the content of the second repeating unit is 5 mol % to 70 mol %, the content of the third repeating unit is 10 mol % to 90 mol %, based on the total molar amount of the first repeating unit, the second repeating unit, and the third repeating unit. In addition, the amount of the fourth repeating unit is 0.01 mol % to 5 mol %, based on the total molar amount of the first repeating unit, the second repeating unit, and the third repeating unit.

According to embodiments of the disclosure, the liquid crystal polymer of the disclosure has an intrinsic viscosity of 1.0 dL/g to 6.0 dL/g (such as 1.5 dL/g, 2 dL/g, 2.5 dL/g, 3 dL/g, 3.5 dL/g, 4 dL/g, 4.5 dL/g, or 5.5 dL/g). Herein, the intrinsic viscosity of the liquid crystal polymer is measured using a method involving the use of 3,5-bis(trifluoromethyl) phenol as a solvent. The liquid crystal polymer is heated and stirred in 3,5-bis(trifluoromethyl)phenol until complete dissolution is achieved, resulting in a solution with a concentration of 0.3 g/dL. Next, the intrinsic viscosity of this solution at 60° C. is measured using an Ostwald viscometer.

The liquid crystal polymer of the disclosure may be prepared from a polymerization of a first monomer, a second monomer, a third monomer, and a fourth monomer. In the liquid crystal polymer of the disclosure, the first repeating unit is derived from the first monomer, the second repeating unit is derived from the second monomer, the third repeating unit is derived from the third monomer, and the fourth repeating unit is derived from the fourth monomer.

According to embodiments of the disclosure, the first monomer may be

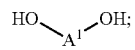

the second monomer may be

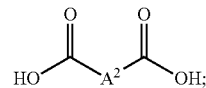

the third monomer may be

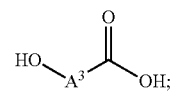

and the fourth monomer may be

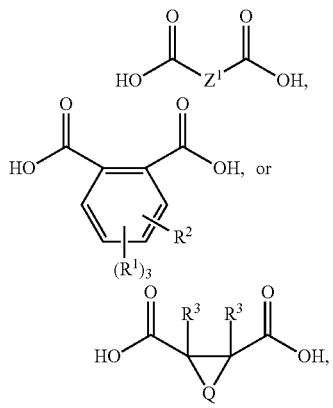

wherein $A^1$, $A^2$, $A^3$, $Z^1$, $R^1$, $R^2$, $R^3$, and Q are the same as defined above.

For example, the first monomer may be

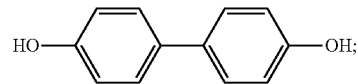

the second monomer may be

the third monomer may be

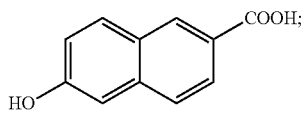 [SMILES: O=C(O)c1ccc2cc(O)ccc2c1]

and the fourth monomer may be itaconic acid, butene diacid, pentene diacid, hexene diacid, hexadienedioic acid, maleic anhydride, 2-methylmaleic anhydride, 2,3-dimethylmaleic anhydride, 3-methyl-4-phenyl-2,5-furandione,

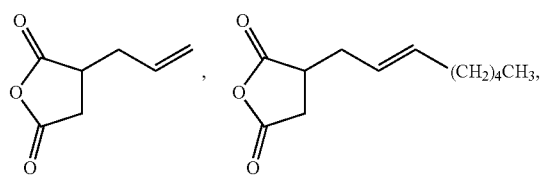

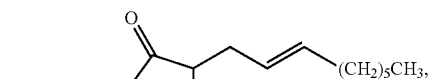

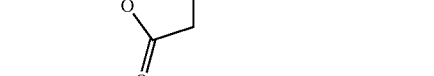

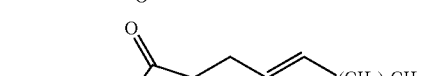

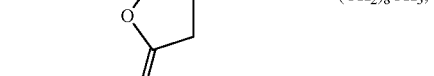

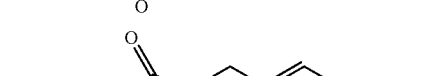

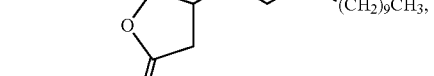

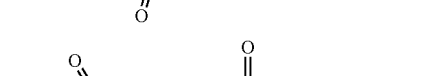

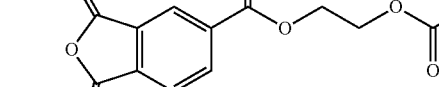

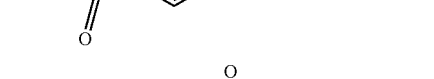

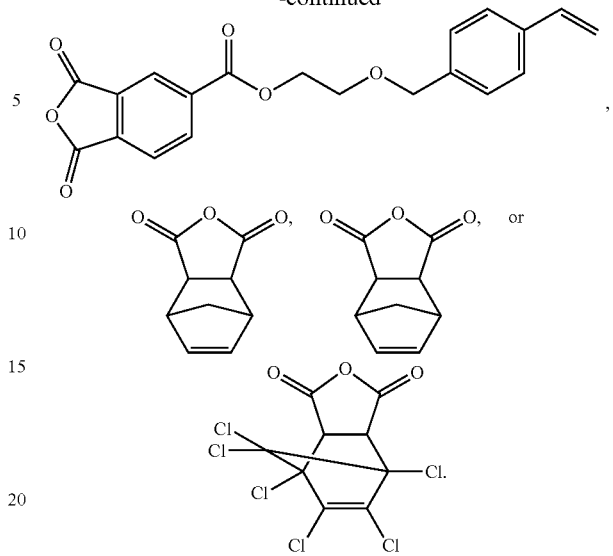

According to embodiments of the disclosure, the amount of the first monomer, second monomer, third monomer, and fourth monomer conforms to the following equation: $0.95 \leq [(2m_1+m_3)/(2m_2+m_3+2m_4)] \leq 1.05$, wherein $m_1$ is the mole number of the first monomer, $m_2$ is the mole number of the second monomer, $m_3$ is the mole number of the third monomer, and $m_4$ is the mole number of the fourth monomer. When the amount of the first monomer, second monomer, third monomer, and fourth monomer do not conform to the aforementioned equation, there may be a higher amount of unreacted monomers remaining after polymerization.

The method for preparing the liquid crystal polymer of the disclosure is not specifically limited. For example, the hydroxyl-containing monomer (such as first monomer, and third monomer) is firstly reacted with excess amount of fatty acid anhydride to perform acylation to form an acylated compound. The acylated compound is reacted with carboxylic acid-containing monomer (or anhydride monomer) (such as second monomer and fourth monomer) to perform transesterification to form the liquid crystal polymer. Alternatively, the acylated compound that is pre-acylated may be reacted with the carboxylic acid-containing monomer to perform the transesterification to form the liquid crystal polymer.

The fatty acid anhydride content in the acylation may be 1.0 to 1.2 times equivalent of the hydroxyl group. The acylation may be performed at 130° C. to 180° C. for 5 minutes to 10 hours, such as 140° C. to 160° C. for 10 minutes to 3 hours.

The fatty acid anhydride for the acylation in the disclosure is not specifically limited and may include acetic anhydride, propionic anhydride, butanoic anhydride, isobutanoic anhydride, pentanoic acid, trimethylacetic anhydride, 2-ethylhexanoic anhydride, monochloro acetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride, the like, or a combination thereof. In some embodiments, the fatty acid anhydride can be acetic anhydride, propionic anhydride, butanoic anhydride, or isobutanoic anhydride.

A catalyst can be added into the acylation and the transesterification. The catalyst can be a known catalyst for polymerization of polyester, such as metal salt catalyst (e.g. magnesium acetate, tin acetate, tetrabutyl titanate, lead acetate, potassium acetate, antimony trioxide, or the like), or organic catalyst such as heterocyclic compound having at least two nitrogen atoms (e.g. N,N'-dimethylaminopyridine, N-methylimidazole, pyrazole, or the like).

An additive can be added into the acylation reaction and the transesterification reaction, and the specific additive those are known in the art includes binding agent, anti-precipitation agent, UV absorber, thermal stabilizer, antioxidant, or a combination thereof.

According to embodiments of the disclosure, the liquid crystal polymer can be manufactured by batch-type equipment, continuous-type equipment, or the like.

According to embodiments of the disclosure, the liquid crystal polymer of the disclosure may be used to prepare a composition including the liquid crystal polymer, a liquid crystal polymer film, or a laminated material (such as flexible copper foil laminated substrate).

The disclosure also provides a composition including the liquid crystal polymer of the disclosure. According to embodiments of the disclosure, the composition can include a first liquid crystal polymer, wherein the first liquid crystal polymer is the liquid crystal polymer of the disclosure. According to embodiments of the disclosure, the composition may consist of the first liquid crystal polymer, and the composition can be subjected to a melting process, obtaining a liquid crystal polymer film.

According to embodiments of the disclosure, in order to enhance the properties of the liquid crystal polymer film prepared from the composition or prepare the liquid crystal polymer film from the composition including the first liquid crystal polymer via a solution process, the composition of the disclosure may further include a second liquid crystal polymer. According to embodiments of the disclosure, the second liquid crystal polymer and the first liquid crystal polymer are different. When the first liquid crystal polymer of the composition is 100 parts by weight, the second liquid crystal polymer is 1 to 300 parts by weight (such as 2 parts by weight, 3 parts by weight, 5 parts by weight, 8 parts by weight, 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 100 parts by weight, 110 parts by weight, 120 parts by weight, 130 parts by weight, 150 parts by weight, 170 parts by weight, 200 parts by weight, 220 parts by weight, 250 parts by weight, or 280 parts by weight).

According to embodiments of the disclosure, the second liquid crystal polymer may include a liquid crystal polymer having a fifth repeating unit, wherein the fifth repeating unit has a structure of Formula (VII)

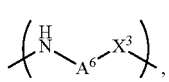

Formula (VII)

wherein $A^6$ are independently $A^4$, or $A^4$-$X^1$-$A^5$, wherein $A^4$, $X^1$ and $A^5$ are the same as defined above; and $X^3$ is —O—, —NH—, or

According to embodiments of the disclosure, the fifth repeating unit may be

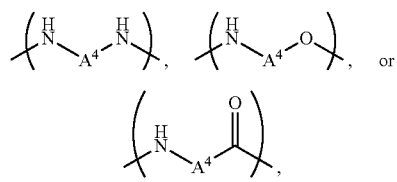

wherein $A^4$ is the same as defined above.

According to embodiments of the disclosure, the fifth repeating unit may be

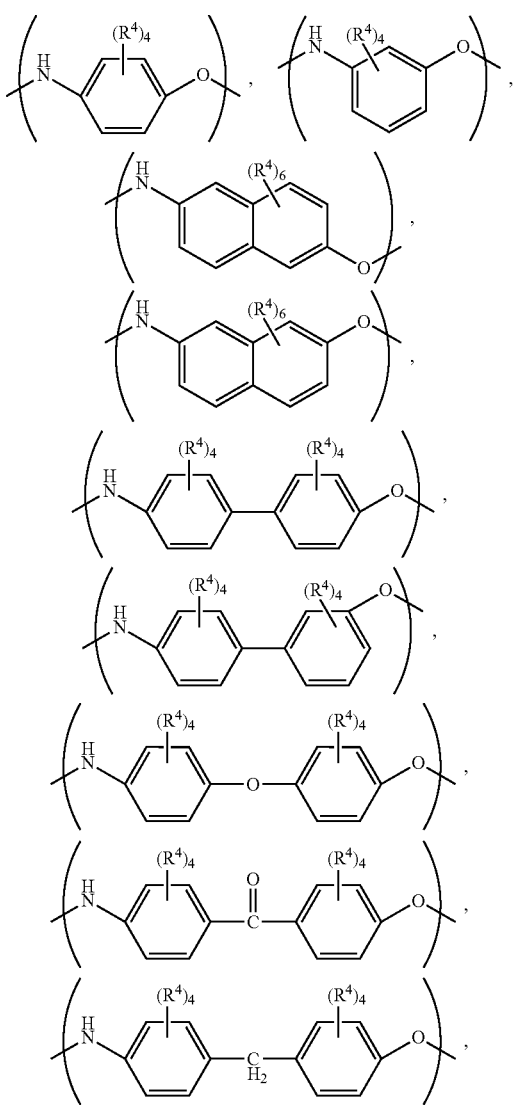

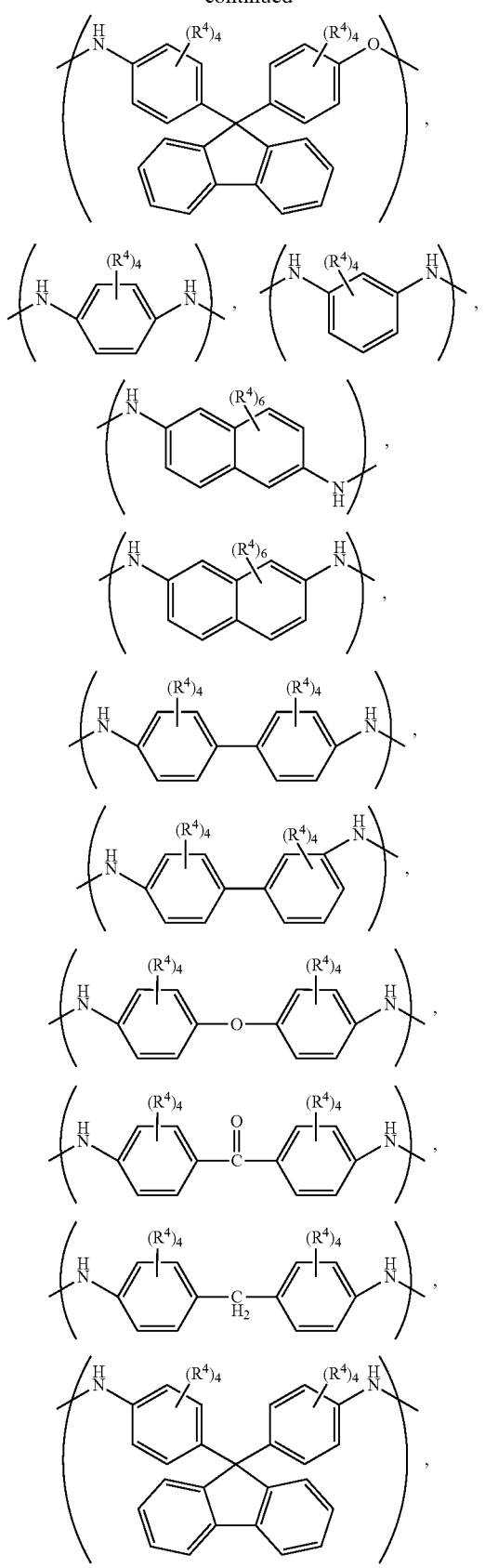

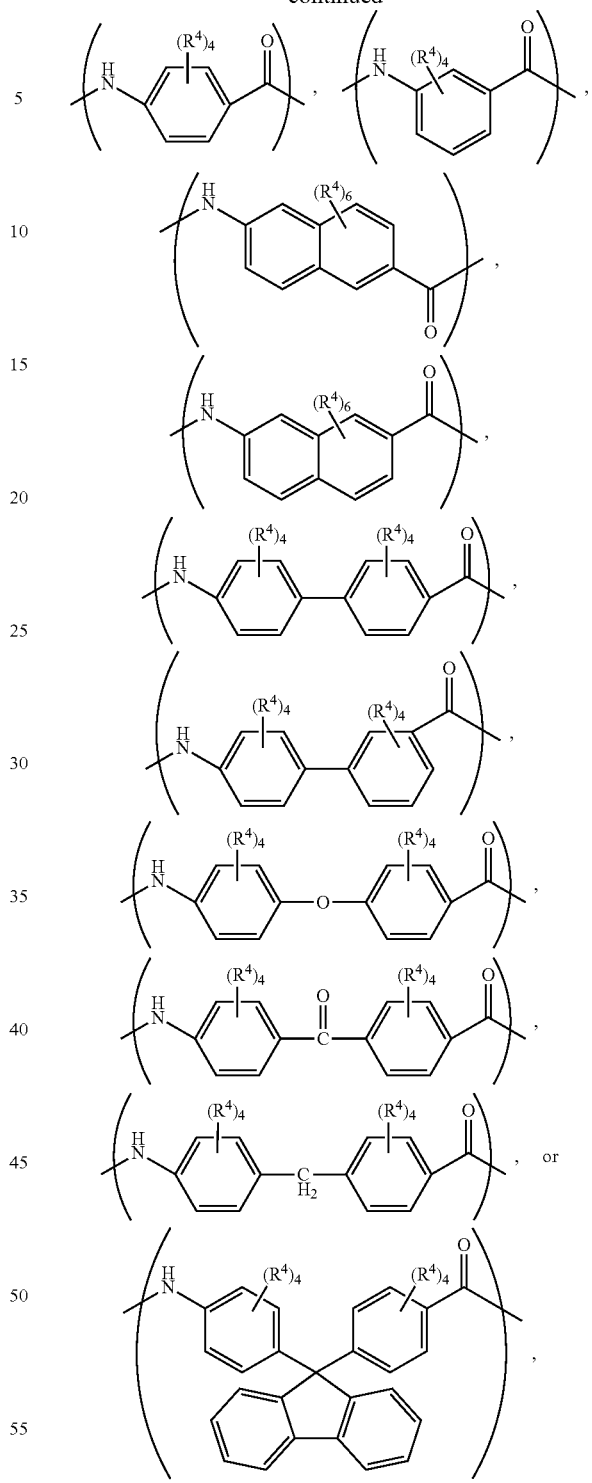

wherein R⁴ is the same as defined above.

According to embodiments of the disclosure, the second liquid crystal polymer may exhibit solubility (i.e. being easy to dissolve in the solvent). According to some embodiments of the disclosure, the second liquid crystal polymer may be a conventional liquid crystal polymer exhibiting solubility. According to other embodiments of the disclosure, the second liquid crystal polymer may have the first repeating unit, the second repeating unit, the third repeating unit, and the fifth repeating unit. Herein, the content of the first repeating unit is $M_1$ mol %, wherein $M_1$ is 10 to 50, such as 15, 20, 25, 30, 35, 40, or 45; the content of the second repeating unit is $M_2$ mol %, wherein $M_2$ is 10 to 50, such as 15, 20, 25, 30, 35, 40, or 45; the content of the third repeating unit is $M_3$ mol %, wherein $M_3$ is 10 to 50, such as 15, 20, 25, 30, 35, 40, or 45; and the content of the fifth repeating unit is $M_5$ mol %, wherein $M_5$ is 10 to 40, such as 15, 20, 25, 30, or 35, based on the total molar amount of the first repeating unit, the second repeating unit, the third repeating unit, and the fifth repeating unit (i.e. the sum of $M_1$, $M_2$, $M_3$, and $M_5$ is 100).

According to embodiments of the disclosure, the second liquid crystal polymer may have the first repeating unit, the second repeating unit, the third repeating unit, the fourth repeating unit, and the fifth repeating unit. Herein, the content of the first repeating unit is $M_1$ mol %, wherein $M_1$ is 10 to 50, such as 15, 20, 25, 30, 35, 40, or 45; the content of the second repeating unit is $M_2$ mol %, wherein $M_2$ is 10 to 50, such as 15, 20, 25, 30, 35, 40, or 45; the content of the third repeating unit is $M_3$ mol %, wherein $M_3$ is 10 to 50, such as 15, 20, 25, 30, 35, 40, or 45; and the content of the fifth repeating unit is $M_5$ mol %, wherein $M_5$ is 10 to 40, such as 15, 20, 25, 30, or 35, based on the total molar amount of the first repeating unit, the second repeating unit, the third repeating unit, and the fifth repeating unit (i.e. the sum of $M_1$, $M_2$, $M_3$, and $M_5$ is 100). According to embodiments of the disclosure, the amount of the fourth repeating unit is $M_4$ mol %, wherein $M_4$ is 0.01 to 10, such as 0.1, 0.2, 0.5, 1, 2, 3, 4, 5, 6, 7, 8, or 9, based on the total molar amount of the first repeating unit, the second repeating unit, the third repeating unit, and the fifth repeating unit.

According to embodiments of the disclosure, the second liquid crystal polymer may consist of first repeating unit, the second repeating unit, the third repeating unit, and the fifth repeating unit. According to embodiments of the disclosure, the second liquid crystal polymer may consist of first repeating unit, the second repeating unit, the third repeating unit, the fourth repeating unit, and the fifth repeating unit. According to embodiments of the disclosure, the second liquid crystal polymer does not include other repeating unit except the first repeating unit, the second repeating unit, the third repeating unit, and the fifth repeating unit. According to embodiments of the disclosure, the second liquid crystal polymer does not include other repeating unit except the first repeating unit, the second repeating unit, the third repeating unit, the fourth repeating unit, and the fifth repeating unit.

According to embodiments of the disclosure, the second liquid crystal polymer may be a liquid crystal polymer exhibiting no solubility (i.e. it is insoluble in the solvent). According to some embodiments of the disclosure, the second liquid crystal polymer may be a conventional liquid crystal polymer exhibiting no solubility. According to other embodiments of the disclosure, the second liquid crystal polymer may have the first repeating unit, the second repeating unit, the third repeating unit, and the second liquid crystal polymer does not have the fourth repeating unit, and fifth repeating unit. According to embodiments of the disclosure, the second liquid crystal polymer may consist of the first repeating unit, the second repeating unit, and the third repeating unit.

According to embodiments of the disclosure, the second liquid crystal polymer includes the first repeating unit, the second repeating unit, the third repeating unit. Herein, the content of the first repeating unit is $M_1$ mol %, wherein $M_1$ is 5 to 70, such as 7, 10, 15, 20, 25, 30, 35, 40, 45, 50, 55, 60, or 65; the content of the second repeating unit is $M_2$ mol %, wherein $M_2$ is 5 to 70, such as 7, 10, 15, 20, 25, 30, 35, 40, 45, 50, 55, 60, or 65; and the content of the third repeating unit is $M_3$ mol %, wherein $M_3$ is 10 to 90, such as 15, 20, 25, 30, 35, 40, 45, 50, 55, 60, 65, 70, 75, 80, or 85, based on the total molar amount of the first repeating unit, the second repeating unit, and the third repeating unit, (i.e. the sum of $M_1$, $M_2$, and $M_3$ is 100).

According to embodiments of the disclosure, in the second liquid crystal polymer, the first repeating unit, second repeating unit, third repeating unit, fourth repeating unit, and fifth repeating unit are the same as defined above.

According to embodiments of the disclosure, the first liquid crystal polymer does not have fifth repeating unit, wherein the fifth repeating unit is the same as defined above.

According to embodiments of the disclosure, the second liquid crystal polymer is not specifically limited and may be commercially available liquid crystal polymer (including commercially available liquid crystal polymer being soluble in the solvent, commercially available liquid crystal polymer being insoluble in the solvent, or a combination thereof). For example, when the composition including the liquid crystal polymer of the disclosure is used in the high-frequency substrate, the second liquid crystal polymer may be commercially available liquid crystal polymer with a dielectric coefficient (Dk) less than 3.7 and a dielectric loss factor (Df) less than 0.005 (@10 GHz).

According to embodiments of the disclosure, the composition of the disclosure for preparing the liquid crystal polymer film may further include 0.1 to 50 parts by weight of filler (such as 0.5 parts by weight, 1 part by weight, 2 parts by weight, 2 parts by weight, 3 parts by weight, 5 parts by weight, 8 parts by weight, 10 parts by weight, 15 parts by weight, 20 parts by weight, 25 parts by weight, 30 parts by weight, 35 parts by weight, 40 parts by weight, or 45 parts by weight), in order to improve the dielectric characteristic or mechanical strength of the liquid crystal polymer film. The filler may be inorganic filler, organic filler, or a combination thereof. The inorganic filler may be silicon oxide, aluminum oxide, titanium oxide, zirconium oxide, hydrous aluminum silicate, calcium carbonate, calcium phosphate, barium titanate, strontium titanate, aluminum hydroxide, or a combination thereof. The organic filler may be epoxy resin, melamine resin, polyurea resin, benzomelamine formaldehyde resin, styrene resin, fluororesin, or a combination thereof. Due to the thermal treatment, the liquid crystal polymer of the disclosure can form a reticulated cross-linked structure. This reticulated cross-linked structure has the capability to immobilize the movement of the filler, thereby achieving the purpose of uniformly dispersing the filler. This optimization enhances the dielectric characteristics or mechanical strength of the liquid crystal polymer film.

According to embodiments of the disclosure, when the composition for preparing the liquid crystal polymer film of the disclosure further includes the second liquid crystal polymer, the composition may further include a solvent, forcing the first liquid crystal polymer and the second liquid crystal polymer being uniformly dispersed/dissolved in the solvent. According to embodiments of the disclosure, the solvent includes halogen-containing solvent, ether solvent, ketone solvent, ester solvent, carbonate solvent, amine solvent, nitrile solvent, amide solvent, nitro solvent, sulfide solvent, phosphide solvent, paraffin, olefin, alcohol, aldehyde, aromatic hydrocarbon, terpene, hydrogenated hydrocarbon, heterocyclic compound, or a combination thereof. When the composition includes solvent, the composition has a solid content of 1 wt % to 50 wt % (such as 2 wt %, 3 wt %, 5 wt %, 10 wt %, 15 wt %, 20 wt %, 25 wt %, 30 wt %, 35 wt %, 40 wt %, or 45 wt %). Herein, the solid content means a weight percentage of the ingredients of the composition except the solvent, based on the total weight of the composition. According to embodiments of the disclosure, the thickness of the film prepared from the composition is directly proportional to the solid content of the composition. Namely, the thickness of the film prepared from the composition can be controlled by adjusting the solid content of the composition. When the solid content of the composition is too low, a thicker film is not apt to be obtained after coating. When the solid content of the composition is too high, the viscosity of composition is too high, making the coating process difficult.

According to embodiments of the disclosure, the composition of the disclosure for preparing the liquid crystal polymer film may further include 0.1 to 30 parts by weight (such as 0.5 parts by weight, 1 part by weight, 2 parts by weight, 3 parts by weight, 5 parts by weight, 8 parts by weight, 10 parts by weight, 15 parts by weight, 20 parts by weight, or 25 parts by weight) of a resin. The resin can include thermoplastic resin or thermosetting resin and does not be a liquid crystal polymer. The thermoplastic resin may be polypropylene (PP), polyamide, polyester (such as non-liquid-crystal polyallylate), polyphenylene sulfide, polyetherketone, polycarbonate, polyether sulfone, polyphenylene ether, polyetherimide, fluororesin, an elastomer (typically, copolymer of glycidyl methacrylate and polyethylene), or a modified product thereof. The thermosetting resin may be phenol formaldehyde resin, epoxy resin, polyimide resin, or cyanate resin. In addition, the other resin can be dissolved in the solvent for the liquid crystal polymer when the other solvent is adopted.

In addition, the composition of the disclosure for preparing the liquid crystal polymer film may further include 0.1 to 20 parts by weight (such as 0.5 parts by weight, 1 part by weight, 2 parts by weight, 3 parts by weight, 5 parts by weight, 8 parts by weight, 10 parts by weight, or 15 parts by weight) of an additive to enhance the size stability, mechanical properties, thermal conductivity, dielectric properties, thermal stability, light stability, anti-aging properties, coatability, and film formability. The additive may include antioxidant, thermal stabilizer, UV absorber, light stabilizer, anti-aging agent, toughening agent, plasticizer, crosslinking agent, additives for coating inks (e.g. defoamer, leveling agent, wetting and dispersing agent, thickener, thixotropy controller, adhesion promoter, or coupling agent), or a combination thereof.

The disclosure provides a liquid crystal polymer film, which is prepared from the composition of the disclosure. The liquid crystal polymer film may be a cured product of the composition of the disclosure. Herein, the term "cured product" refers to the film obtained after the composition has undergone a curing process (such as thermocompression bonding, screw extrusion, coating and heating, etc). According to embodiments of the disclosure, the thickness of the liquid crystal polymer film is not limited and may be 1 μm to 100 μm. The liquid crystal polymer film may have a coefficient of thermal expansion (between 50° C. and 100° C.) lower than 25 ppm/° C., such as 10 ppm/° C. to 25 ppm/° C., or 10 ppm/° C. to 22 ppm/° C. (such as 15 ppm/° C., 18 ppm/° C., or 20 ppm/° C.). In another embodiments, when the first liquid crystal polymer is used in a solution process (i.e. the composition includes second liquid crystal polymer, and the second liquid crystal polymer is easy to dissolve in the solvent), the obtained liquid crystal polymer film has a coefficient of thermal expansion (between 50° C. and 100° C.) of 10 ppm/° C. to 40 ppm/° C. (such as 15 ppm/° C., 20 ppm/° C., 25 ppm/° C., 30 ppm/° C., or 35 ppm/° C.). The coefficient of thermal expansion (between 50° C. and 100° C.) is determined according to ASTM D696 by dynamic mechanical analysis (DMA).

The disclosure provides a method for forming a liquid crystal polymer film. According to embodiments of the disclosure, the method can include following steps. The composition including the first liquid crystal polymer is subjected to a melting process with a temperature of 200° C. to 350° C. (such as 220° C., 250° C., 280° C., 300° C., or 330° C.), and the time of thermal treatment may be 30 minutes to 10 hours (such as 1 hour, 2 hours, 3 hours, 4 hours, 5 hours, 6 hours, 7 hours, 8 hours, or 9 hours), obtaining the liquid crystal polymer film.

According to embodiments of the disclosure, the method for forming a liquid crystal polymer film of the disclosure also can include following steps. First, the composition of the disclosure including the first liquid crystal polymer and the second liquid crystal polymer is coated on a support via a solution process (such as roller coating, dip coating, spray coating, spin coating, curtain coating, slot coating, or screen coating) to form a coating. After coating and performing a thermal treatment, the liquid crystal polymer film is formed. The support may be copper foil, glass, aluminum foil, or another suitable material. After coating, the coating is subjected to a thermal treatment (inducing double bond cross-linking reactivity and removing the solvent from the composition), resulting in the formation of a liquid crystal polymer film on the support. The support can be then optionally removed (depending on the application requirement) by the method such as etching or peeling. The temperature of thermal treatment may be about 200° C. to 320° C. (such as 220° C., 250° C., 280° C., and 300° C.), and the time of thermal treatment may be 30 minutes to 10 hours (such as 1 hour, 2 hours, 3 hours, 4 hours, 5 hours, 6 hours, 7 hours, 8 hours, or 9 hours).

Figure 2:
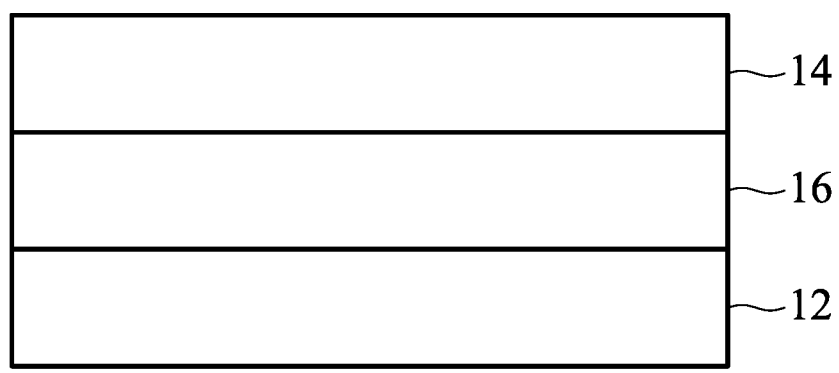
FIG. 2 is a cross-sectional view of the laminated material according to another embodiment of the disclosure.

The disclosure also provides a laminated material, such as flexible copper foil laminated substrate. FIG. 1 shows a cross-sectional view of the laminated material 10 according to an embodiment of the disclosure. As shown in FIG. 1, the laminated material 10 can include a support 12, and a liquid crystal polymer film 14 disposed on the support 12. In addition, according to embodiments of the disclosure, the laminated material 10 may further include an adhesive layer 16 disposed between the support 12 and the liquid crystal polymer film 14, in order to bond the liquid crystal polymer film 14 on the support 12, as shown in FIG. 2. When the laminated material is applied to the printed circuit board, some adhesive having excellent electric properties (e.g. fluororesin) can be introduced to reduce the transmission loss of the printed circuit board. The laminated material can be further manufactured as a laminated material with double-sided copper foils. For example, the laminated materials with single-sided copper foil can be attached to each other and heat pressed to form a laminated material with double-sided copper foils, in which a middle layer of the liquid crystal polymer film is interposed between a top layer of the copper foil and a bottom layer of the copper foil.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLE

Example 1

Hydroquinone (0.45 mol), 2,6-naphthalenedicarboxylic acid (0.3 mol), isophthalic acid (0.15 mol), 6-hydroxy-2-naphthoic acid (2.1 mol), maleic anhydride (0.015 mol), and acetic anhydride (3.03 mol) were mixed, and the mixture was heated at 150° C. under nitrogen atmosphere for 2 hours. Next, after heating to 330° C. for 1 hour, the temperature was maintained at 330° C., a vacuum was gradually applied and the intrinsic viscosity (IV) of the result was monitored. When the intrinsic viscosity (IV) of the result reached the desired viscosity (4.0 dL/g), the vacuum was broken using nitrogen, and the product was extruded under nitrogen pressure, obtaining Liquid crystal polymer (1). The intrinsic viscosity (IV) was measured by Ostwald viscometer according to the method as disclosed above. Next, the decomposition temperature (Td) and the ratio of the repeating units of Liquid crystal polymer (1) were measured, and the results are shown in Table 1.

The decomposition temperature of the liquid crystal polymer was determined by thermogravimetric analyzer (TGA) and the ratio of the repeating units of the liquid crystal polymer was determined by nuclear magnetic resonance spectroscopy (NMR).

Next, Liquid crystal polymer (1) was subjected to a melting process at 320° C., obtaining Liquid crystal polymer film (1) (with a thickness about 50 μm).

Next, the melting point (Tm), dielectric coefficient (Dk), dielectric loss factor (Df), and coefficient of thermal expansion (CTE) between 50° C. and 100° C. of Liquid crystal polymer film (1) were measured, and the results are shown in Table 2.

The melting point (Tm) of the liquid crystal polymer film was determined by differential scanning calorimetry (DSC); the dielectric coefficient and dielectric loss factor of the liquid crystal polymer film was determined by resonant cavity type microwave dielectrometer at 10 GHz via the method according to JIS-compliant 1641; and the coefficient of thermal expansion (CTE) between 50° C. and 100° C. of liquid crystal polymer film was determined according to ASTM D696 by dynamic mechanical analysis (DMA).

Example 2

Hydroquinone (0.45 mol), 2,6-naphthalenedicarboxylic acid (0.3 mol), isophthalic acid (0.15 mol), 6-hydroxy-2-naphthoic acid (2.1 mol), maleic anhydride (0.048 mol), and acetic anhydride (3.03 mol) were mixed, and the mixture was heated at 150° C. under nitrogen atmosphere for 2 hours. Next, after heating to 330° C. for 1 hour, the temperature was maintained at 330° C., a vacuum was gradually applied and the intrinsic viscosity (IV) of the result was monitored. When the intrinsic viscosity (IV) of the result reached the desired viscosity (3.8 dL/g), the vacuum was broken using nitrogen, and the product was extruded under nitrogen pressure, obtaining Liquid crystal polymer (2). The intrinsic viscosity (IV) was measured by Ostwald viscometer according to the method as disclosed above. Next, the decomposition temperature (Td) and the amount of the repeating units of Liquid crystal polymer (2) were measured, and the results are shown in Table 1.

Next, Liquid crystal polymer (2) was subjected to a melting process at 320° C., obtaining Liquid crystal polymer film (2) (with a thickness about 50 μm).

Next, the melting point (Tm), dielectric coefficient (Dk), dielectric loss factor (Df), and coefficient of thermal expansion (CTE) between 50° C. and 100° C. of Liquid crystal polymer film (2) were measured, and the results are shown in Table 2.

Example 3

Hydroquinone (0.45 mol), 2,6-naphthalenedicarboxylic acid (0.3 mol), isophthalic acid (0.15 mol), 6-hydroxy-2-naphthoic acid (2.1 mol), itaconic acid (0.048 mol), and acetic anhydride (3.03 mol) were mixed, and the mixture was heated at 150° C. under nitrogen atmosphere for 2 hours. Next, after heating to 330° C. for 1 hour, the temperature was maintained at 330° C., a vacuum was gradually applied and the intrinsic viscosity (IV) of the result was monitored. When the intrinsic viscosity (IV) of the result reached the desired viscosity (3.9 dL/g), the vacuum was broken using nitrogen, and the product was extruded under nitrogen pressure, obtaining Liquid crystal polymer (3). The intrinsic viscosity (IV) was measured by Ostwald viscometer according to the method as disclosed above. Next, the decomposition temperature (Td) and the amount of the repeating units of Liquid crystal polymer (3) were measured, and the results are shown in Table 1.

Next, Liquid crystal polymer (3) was subjected to a melting process at 320° C., obtaining Liquid crystal polymer film (3) (with a thickness about 50 μm).

Next, the melting point (Tm), dielectric coefficient (Dk), dielectric loss factor (Df), and coefficient of thermal expansion (CTE) between 50° C. and 100° C. of Liquid crystal polymer film (3) were measured, and the results are shown in Table 2.

Comparative Example 1

Hydroquinone (0.45 mol), 2,6-naphthalenedicarboxylic acid (0.3 mol), isophthalic acid (0.15 mol), 6-hydroxy-2-naphthoic acid (2.1 mol), and acetic anhydride (3.03 mol) were mixed, and the mixture was heated at 150° C. under nitrogen atmosphere for 2 hours. Next, after heating to 330° C. for 1 hour, the temperature was maintained at 330° C., a vacuum was gradually applied and the intrinsic viscosity (IV) of the result was monitored. When the intrinsic viscosity (IV) of the result reached the desired viscosity (4.2 dL/g), the vacuum was broken using nitrogen, and the product was extruded under nitrogen pressure, obtaining Liquid crystal polymer (4). The intrinsic viscosity (IV) was measured by Ostwald viscometer according to the method as disclosed above. Next, the decomposition temperature (Td) and the amount of the repeating units of Liquid crystal polymer (4) were measured, and the results are shown in Table 1.

Next, Liquid crystal polymer (4) was subjected to a melting process at 320° C., obtaining Liquid crystal polymer film (4) (with a thickness about 50 μm).

Next, the melting point (Tm), dielectric coefficient (Dk), dielectric loss factor (Df), and coefficient of thermal expansion (CTE) between 50° C. and 100° C. of Liquid crystal polymer film (4) were measured, and the results are shown in Table 2.

TABLE 1

|  | Liquid crystal polymer (1) | Liquid crystal polymer (2) | Liquid crystal polymer (3) | Liquid crystal polymer (4) |
|---|---|---|---|---|
| Content of first repeating unit ($M_1$) (mol %) | 15 | 15 | 15 | 15 |
| Content of second repeating unit ($M_2$) (mol %) | 15 | 15 | 15 | 15 |
| Content of third repeating unit ($M_3$) (mol %) | 70 | 70 | 70 | 70 |
| molar number of fourth repeating unit/(total molar number of first repeating unit, second repeating unit, and third repeating unit) | 0.005 | 0.016 | 0.016 | 0 |
| decomposition temperature (° C.) | 490 | 488 | 489 | 487 |

*: the content of first repeating unit, second repeating unit, and third repeating unit (mol %) was measured based on the total molar number of first repeating unit, second repeating unit, and third repeating unit.

TABLE 2

|  | Liquid crystal polymer film (1) | Liquid crystal polymer film (2) | Liquid crystal polymer film (3) | Liquid crystal polymer film (4) |
|---|---|---|---|---|
| melting point (° C.) | 265 | 262 | 260 | 266 |
| dielectric coefficient | 3.26 | 3.33 | 3.33 | 3.5 |
| dielectric loss factor | 0.0011 | 0.0011 | 0.0011 | 0.001 |
| coefficient of thermal expansion (ppm/° C.) | 24.6 | 18.3 | 19.1 | 26.2 |

As shown in Table 2, in comparison with Comparative Example 1, the specific diacid or anhydride (such as maleic anhydride or itaconic acid) was added in the preparation of liquid crystal polymer, the liquid crystal polymer having the fourth repeating unit was obtained, thereby reducing the coefficient of thermal expansion (close to the coefficient of thermal expansion of copper foil (about 18 ppm/° C.)).

Example 4

Hydroquinone (0.7 mol), isophthalic acid (0.7 mol), 6-hydroxy-2-naphthoic acid (0.7 mol), 4-aminobenzoic acid (0.7 mol), and acetic anhydride (2.8 mol) were mixed, and the mixture was heated at 150° C. under nitrogen atmosphere for 3 hours. Next, after heating to 320° C. for 1 hour, the temperature was maintained at 320° C., a vacuum was gradually applied and the intrinsic viscosity (IV) of the result was monitored. When the intrinsic viscosity (IV) of the result reached the desired viscosity (1.20 dL/g), the vacuum was broken using nitrogen, and the product was extruded under nitrogen pressure, obtaining Liquid crystal polymer (5). Liquid crystal polymer (5) was dissolved in 1-methyl-2-pyrrolidinone (NMP) to form a coating composition (with a solid content of 8 wt %). Next, the coating composition was coated on the copper foil by blade coating. After drying and subjecting to a thermal treatment at 200° C. to 300° C., a liquid crystal polymer film (with a thickness about 25 μm) adhered to the copper foil. After removing the copper foil by etching, Liquid crystal polymer film (5) was obtained.

In addition, Liquid crystal polymer (5) (70 parts by weight) was dissolved in 1-methyl-2-pyrrolidinone (NMP).

Next, Liquid crystal polymer (2) (30 parts by weight) was uniformly dispersed in the solution including Liquid crystal polymer (2) and 1-methyl-2-pyrrolidinone (NMP) to form a coating composition (with a solid content of 10 wt %). Next, the coating composition was coated onto a copper foil by blade coating. After drying and subjecting to a thermal treatment at 200° C. to 320° C., a liquid crystal polymer film (with a thickness about 25 μm) adhered to the copper foil. After removing the copper foil by etching, Liquid crystal polymer film (6) was obtained.

Next, the melting point (Tm), dielectric coefficient (Dk), dielectric loss factor (Df), and coefficient of thermal expansion (CTE) between 50° C. and 100° C. of Liquid crystal polymer films (5) and (6) were measured, and the results are shown in Table 3.

TABLE 3

|  | Liquid crystal polymer film (5) | Liquid crystal polymer film (6) |
|---|---|---|
| Liquid crystal polymer (5) (wt %) | 100 | 70 |
| Liquid crystal polymer (2) (wt %) | 0 | 30 |
| dielectric coefficient | 3.79 | 3.20 |
| dielectric loss factor | 0.0048 | 0.0031 |
| coefficient of thermal expansion (ppm/° C.) | 49.3 | 32.0 |

Accordingly, since anhydride (or diacid) monomers containing reactive carbon-carbon double bonds (such as non-aromatic carbon-carbon double bonds) are introduced into the composition used to prepare the liquid crystal polymer, the liquid crystal polymer of the disclosure has repeating units capable of undergoing a cross-linking reaction. Through polymerization involving reactive carbon-carbon double bonds, the composition including the liquid crystal polymer of the disclosure can form a liquid crystal polymer film with a cross-linked network structure after thermal treatment. On the premise that the dielectric coefficient (Dk) and dielectric loss factor (Df) are not increased, the coefficient of thermal expansion of the liquid crystal polymer film is reduced, achieving a better match of the coefficient of thermal expansion between the liquid crystal polymer film and the substrate (i.e. support) used in the laminated material.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A liquid crystal polymer, comprising a first repeating unit, a second repeating unit, a third repeating unit, and a fourth repeating unit, wherein the first repeating unit has a structure of Formula (I), the second repeating unit has a structure of Formula (II), the third repeating unit has a structure of Formula (III), and the fourth repeating unit has a structure of Formula (IV), a structure of Formula (V), or a structure of Formula (VI)

Formula (I)

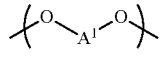

-continued $$\left(\begin{array}{c} O \\ \| \\ -C-A^2-C- \\ \| \\ O \end{array}\right)$$ Formula (II)

$$\left(\begin{array}{c} O \\ \| \\ -O-A^3-C- \\ \| \\ O \end{array}\right)$$ Formula (III)

$$\left(\begin{array}{c} O \\ \| \\ -C-Z^1-C- \\ \| \\ O \end{array}\right)$$ Formula (IV)

Formula (V)

Formula (VI)

wherein $A^1$, $A^2$, and $A^3$ are independently $A^4$, or $A^4$-$X^1$-$A^5$, $A^4$ and $A^5$ are independently

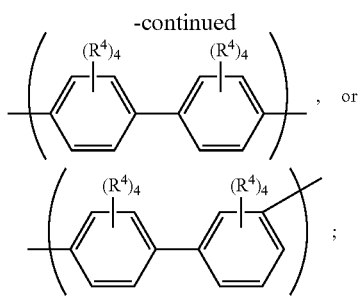

$X^1$ is a single bond, —O—, —NH—,

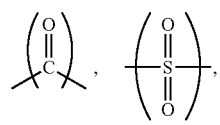

C1-C8 alkylene group, C5-C8 cycloalkylene group, or

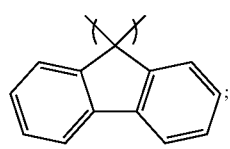

$Z^1$ is C2-C20 alkenylene group or substituted C2-C20 alkenylene group; $R^1$ is independently hydrogen, fluorine, chlorine, C1-C6 alkyl group, C1-C6 fluoroalkyl group, or C6-C12 aryl group; $R^2$ is $-(X^2-Z^2-R^5)$; $R^3$ is independently hydrogen, fluorine, chlorine, C1-C6 alkyl group, or C1-C6 fluoroalkyl group; $R^4$ is independently hydrogen, fluorine, chlorine, cyano group, C1-C6 alkyl group, C1-C6 fluoroalkyl group, C1-C6 alkoxy group, C1-C6 alkylthio group, C1-C6 cyanoalkyl group, C6-C12 aryl group, C7-C18 arylalkyl group, C6-C12 aryloxy group, or C6-C12 arylthio group; $X^2$ is a single bond, —O—, —NH—,

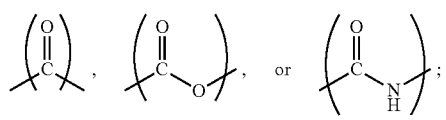

$Z^2$ is a single bond, or C1-C8 alkylene group; $R^5$ is C2-C20 alkenyl group, acrylate group, methacrylate group,

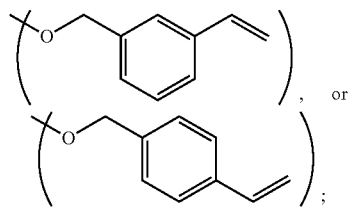

and Q is combined with the carbon atoms which they are attached to, to form a C4-C8 cycloalkene, non-substituted norbornene, non-substituted 7-oxanorbornene, substituted norbornene, or substituted 7-oxanorbornene.

2. The liquid crystal polymer as claimed in claim 1, wherein the amount of the fourth repeating unit is 0.01 mol % to 10 mol %, based on the total molar amount of the first repeating unit, the second repeating unit, and the third repeating unit.

3. The liquid crystal polymer as claimed in claim 2, wherein based on the total molar amount of the first repeating unit, the second repeating unit, and the third repeating unit, the content of the first repeating unit is 5 mol % to 70 mol %, the content of the second repeating unit is 5 mol % to 70 mol %, and the content of the third repeating unit is 10 mol % to 90 mol %.

4. The liquid crystal polymer as claimed in claim 1, wherein the fourth repeating unit is

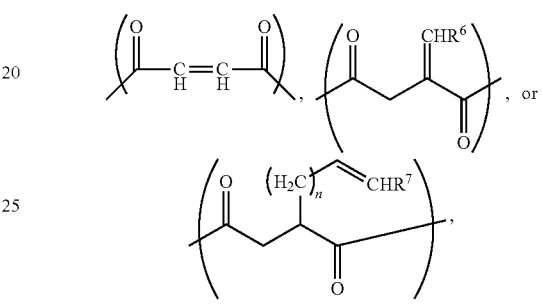

wherein $R^6$ is hydrogen or C1-C17 alkyl group; $R^7$ is hydrogen or C1-C15 alkyl group; and n is an integer from 1 to 16.

5. The liquid crystal polymer as claimed in claim 1, wherein the fourth repeating unit is

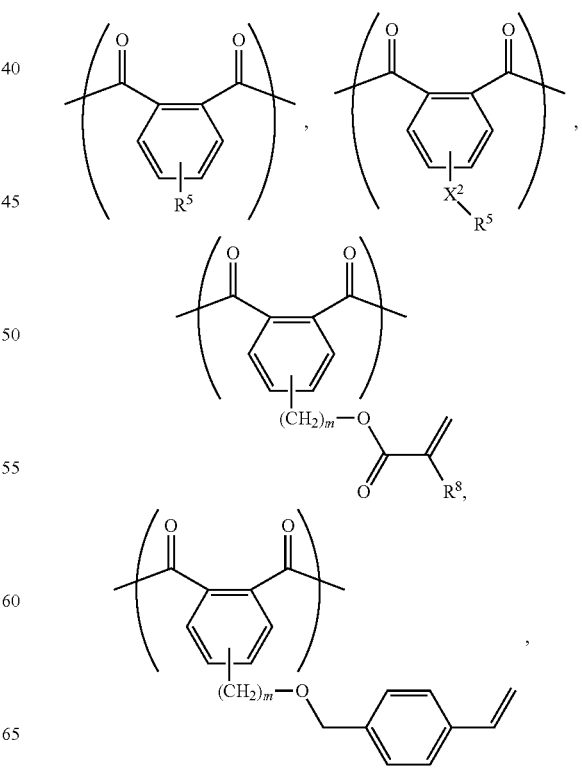

-continued
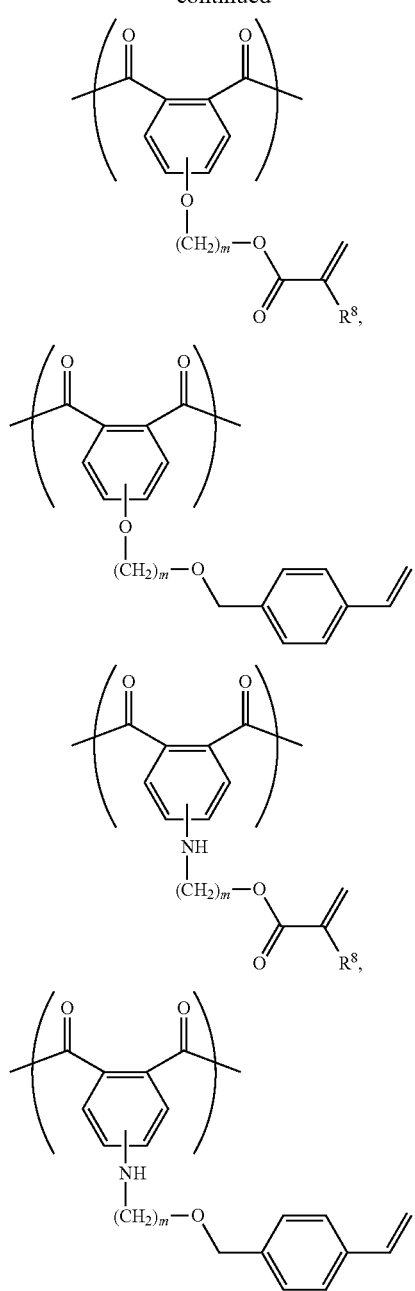
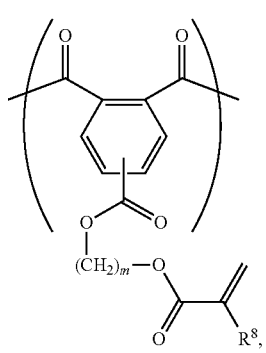
-continued
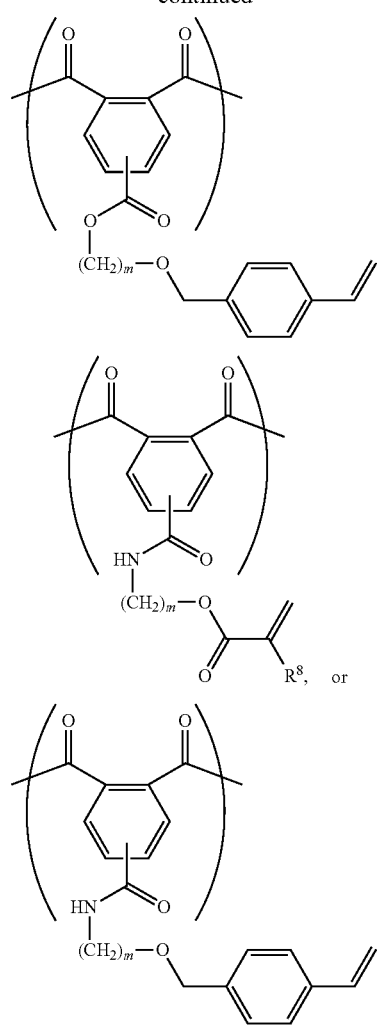
wherein $X^2$ is —O—, —NH—,
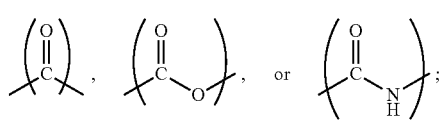
or
$R^5$ is C2-C20 alkenyl group; $R^8$ is hydrogen or methyl; and m is an integer from 1 to 8.
6. The liquid crystal polymer as claimed in claim 1, wherein the fourth repeating unit is
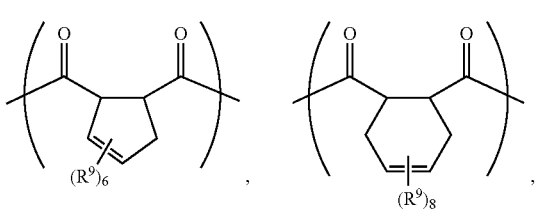

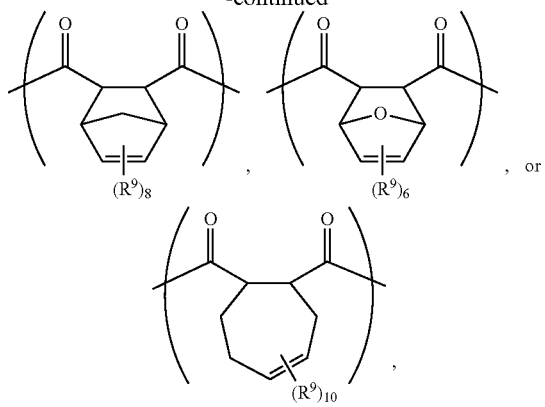

wherein $R^9$ is independently hydrogen, fluorine, chlorine, C1-C6 alkyl group, or C1-C6 fluoroalkyl group.

7. A composition, comprising:
   a first liquid crystal polymer, wherein the first liquid crystal polymer is the liquid crystal polymer as claimed in claim 1.

8. The composition as claimed in claim 7, further comprising:
   1 to 300 parts by weight of a second liquid crystal polymer, wherein the first liquid crystal polymer is 100 parts by weight, and the first liquid crystal polymer and the second liquid crystal polymer are different.

9. The composition as claimed in claim 8, wherein the second liquid crystal polymer has a first repeating unit, a second repeating unit, a third repeating unit, a fourth repeating unit, and a fifth repeating unit, wherein
   the first repeating unit has a structure of Formula (I),
   the second repeating unit has a structure of Formula (II),
   the third repeating unit has a structure of Formula (III),
   the fourth repeating unit has a structure of Formula (IV), a structure of Formula (V), or a structure of Formula (VI), and
   the fifth repeating unit has a structure of Formula (VII)

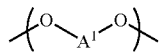 Formula (I)

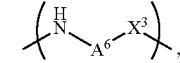 Formula (II)

Formula (III)

Formula (IV)

Formula (V)

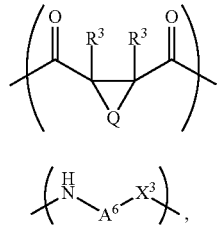 Formula (VI)

Formula (VII)

wherein $A^1$, $A^2$, and $A^3$ are independently $A^4$, or $A^4$-$X^1$-$A^5$, $A^4$ and $A^5$ are independently

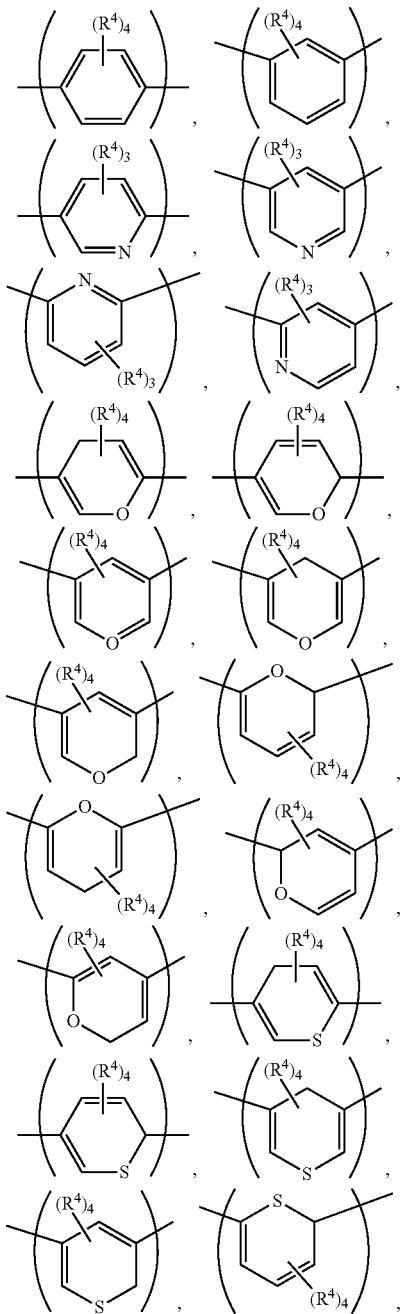

-continued

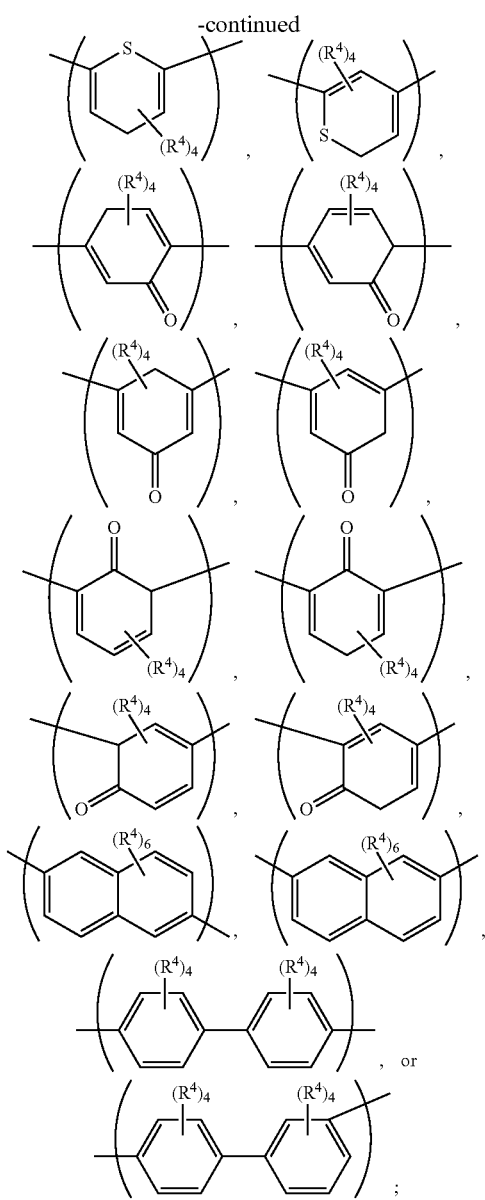, or $X^1$ is a single bond, —O—, —NH—,

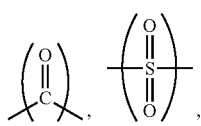,

C1-C8 alkylene group, C5-C8 cycloalkylene group, or

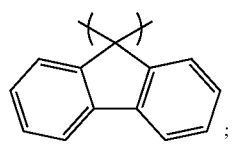;

$Z^1$ is C2-C20 alkenylene group or substituted C2-C20 alkenylene group; $R^1$ is independently hydrogen, fluorine, chlorine, C1-C6 alkyl group, C1-C6 fluoroalkyl group, or C6-C12 aryl group; $R^2$ is $-(-X^2-Z^2-R^5)$; $R^3$ is independently hydrogen, fluorine, chlorine, C1-C6 alkyl group, or C1-C6 fluoroalkyl group; $R^4$ is independently hydrogen, fluorine, chlorine, cyano group, C1-C6 alkyl group, C1-C6 fluoroalkyl group, C1-C6 alkoxy group, C1-C6 alkylthio group, C1-C6 cyanoalkyl group, C6-C12 aryl group, C7-C18 arylalkyl group, C6-C12 aryloxy group, or C6-C12 arylthio group; $X^2$ is a single bond, —O—, —NH—,

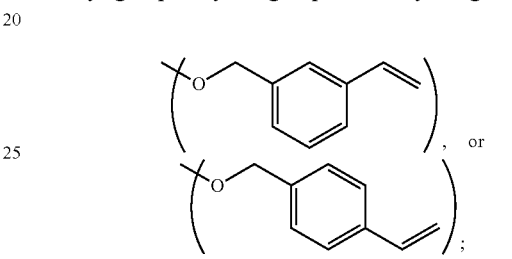;

$Z^2$ is a single bond, or C1-C8 alkylene group; $R^5$ is C2-C20 alkenyl group, acrylate group, methacrylate group,

;

Q is combined with the carbon atoms which they are attached to, to form a C4-C8 cycloalkene, non-substituted norbornene, non-substituted 7-oxanorbornene, substituted norbornene, or substituted 7-oxanorbornene; $A^6$ is $A^4$, or $A^4$-$X^1$-$A^5$, and, $X^3$ is —O—, —NH—, or

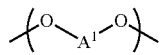.

10. The composition as claimed in claim 8, wherein the second liquid crystal polymer has a first repeating unit, a second repeating unit, a third repeating unit, and a fifth repeating unit, wherein the first repeating unit has a structure of Formula (I),
the second repeating unit has a structure of Formula (II),
the third repeating unit has a structure of Formula (III), and
the fifth repeating unit has a structure of Formula (VII)

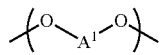   Formula (I)

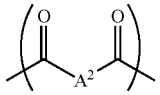   Formula (II)

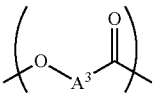   Formula (III)

Formula (VII)

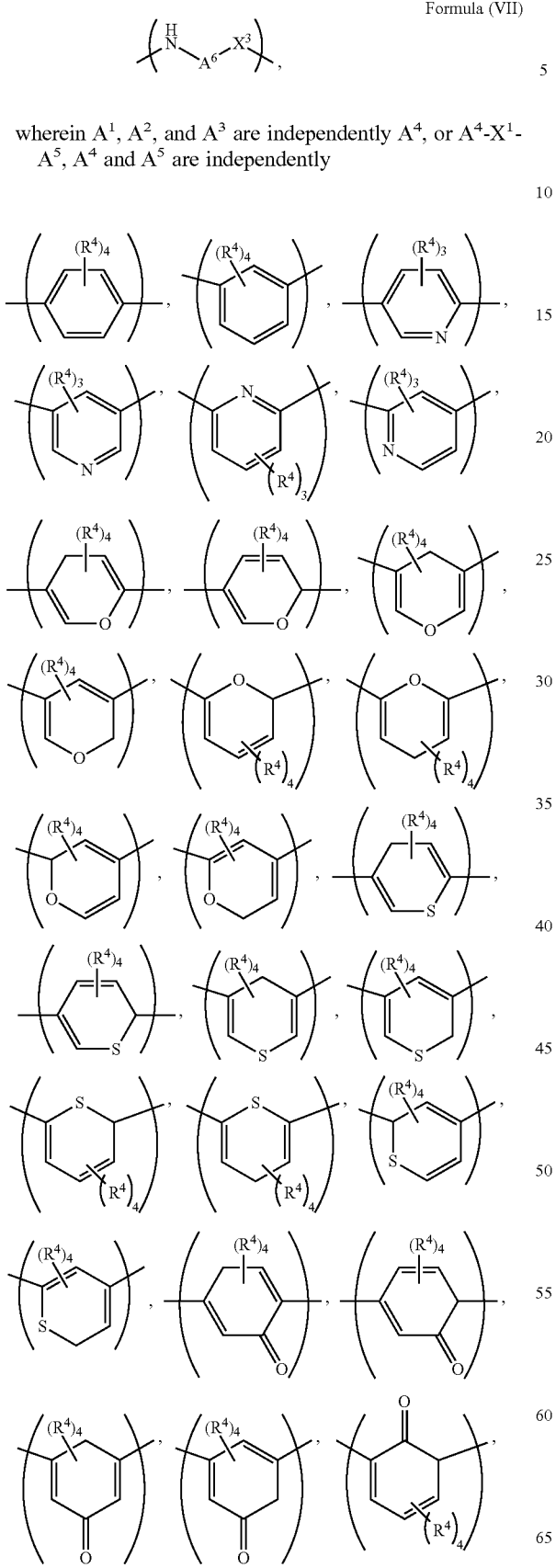

wherein $A^1$, $A^2$, and $A^3$ are independently $A^4$, or $A^4$-$X^1$-$A^5$, $A^4$ and $A^5$ are independently

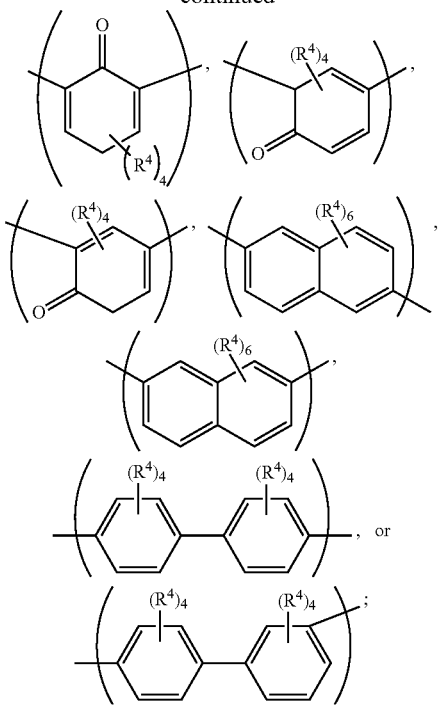

$X^1$ is a single bond, —O—, —NH—,

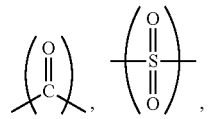

C1-C8 alkylene group, C5-C8 cycloalkylene group, or

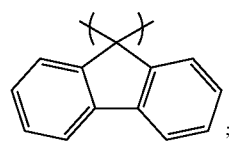

$R^4$ is independently hydrogen, fluorine, chlorine, cyano group, C1-C6 alkyl group, C1-C6 fluoroalkyl group, C1-C6 alkoxy group, C1-C6 alkylthio group, C1-C6 cyanoalkyl group, C6-C12 aryl group, C7-C18 arylalkyl group, C6-C12 aryloxy group, or C6-C12 arylthio group; $A^6$ is $A^4$, or $A^4$-$X^1$-$A^5$, and, $X^3$ is —O—, —NH—, or

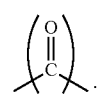

11. The composition as claimed in claim 7, further comprising:
   0.1 to 50 parts by weight of a filler, wherein the filler is inorganic filler, organic filler, or a combination thereof, wherein the first liquid crystal polymer is 100 parts by weight.

12. The composition as claimed in claim 8, further comprising:
   a solvent, wherein the first liquid crystal polymer and second liquid crystal polymer are uniformly dispersed or dissolved in the solvent.

13. The composition as claimed in claim 12, wherein a total amount of the first liquid crystal polymer and the second liquid crystal polymer is in a range of 1 wt % to 50 wt %.

14. A liquid crystal polymer film, which is a cured product of the composition as claimed in claim 7.

15. The liquid crystal polymer film as claimed in claim 14, wherein the coefficient of thermal expansion between 50° C. and 100° C. of the liquid crystal polymer film is 10 ppm/° C. to 40 ppm/° C.

16. A laminated material, comprising:
   a support; and
   the liquid crystal polymer film as claimed in claim 14 disposed on the support.

17. The laminated material as claimed in claim 16, wherein the support includes copper foil, glass, or aluminum foil.

18. The laminated material as claimed in claim 16, further comprising:
   an adhesive layer disposed between the support and the liquid crystal polymer film.

19. A method for forming a liquid crystal polymer film, comprising:
   subjecting to the composition as claimed in claim 7 to a melting process or a solution process, obtaining a liquid crystal polymer film.

\* \* \* \* \*